(12) United States Patent
Chernoff et al.

(10) Patent No.: US 7,000,318 B2
(45) Date of Patent: Feb. 21, 2006

(54) METHOD OF DESIGNING AND MANUFACTURING VEHICLES

(75) Inventors: Adrian B. Chernoff, Royal Oak, MI (US); Christopher E. Borroni-Bird, Oakland Township, MI (US); Mohsen D. Shabana, Ann Arbor, MI (US); Robert Louis Vitale, Macomb Township, MI (US)

(73) Assignee: General Motors Corporation, Detroit, MI (US)

( * ) Notice: Subject to any disclaimer, the term of this patent is extended or adjusted under 35 U.S.C. 154(b) by 447 days.

(21) Appl. No.: 10/202,488

(22) Filed: Jul. 24, 2002

(65) Prior Publication Data

US 2003/0040828 A1 Feb. 27, 2003

Related U.S. Application Data

(60) Provisional application No. 60/337,994, filed on Dec. 7, 2001, provisional application No. 60/314,501, filed on Aug. 23, 2001.

(51) Int. Cl.
*B62D 23/00* (2006.01)

(52) U.S. Cl. .................. 29/897.2; 29/401.1; 29/428; 29/469; 296/181.1; 296/193.04; 296/203.01

(58) Field of Classification Search .............. 29/897.2, 29/428, 430, 469, 791, 401.1; 296/181.1, 296/190.04, 193.04, 203.01, 35.3, 509; 180/291, 180/65.1
See application file for complete search history.

(56) References Cited

U.S. PATENT DOCUMENTS

| 2,303,286 A | 11/1942 | Lake |
| 2,927,817 A | 3/1960 | Raup ........................... 296/35 |
| 3,722,948 A | 3/1973 | Walsh et al. |
| 4,165,794 A | 8/1979 | Warner et al. |
| 4,189,864 A | 2/1980 | Saito ........................... 46/202 |
| 4,216,839 A | 8/1980 | Gould et al. |
| 4,363,999 A | 12/1982 | Preikschat |
| 4,422,685 A | 12/1983 | Bonfilio et al. ............. 296/197 |
| 4,489,977 A | 12/1984 | Earing, Jr. |
| 4,842,326 A | 6/1989 | DiVito ........................ 296/196 |
| 5,058,016 A | 10/1991 | Davidovitch |
| 5,193,635 A | 3/1993 | Mizuno et al. ............. 180/65.3 |
| 5,301,997 A * | 4/1994 | Cudden .................... 296/182.1 |
| 5,352,011 A | 10/1994 | Kihara et al. |
| 5,366,281 A | 11/1994 | Littlejohn ....................... 303/3 |

(Continued)

FOREIGN PATENT DOCUMENTS

EP 274993 2/1991

(Continued)

OTHER PUBLICATIONS

Stuart Birch, "Stick or Non-Stick," Automotive Engineering International On Line, Mar. 2000.

(Continued)

*Primary Examiner*—David P. Bryant
*Assistant Examiner*—Jermie E. Cozart
(74) *Attorney, Agent, or Firm*—Kathryn A. Marra

(57) ABSTRACT

An accelerated vehicle development process includes establishing a common, standardized interface system whereby different types of vehicle bodies may be attached to a single chassis design. Chassis and bodies are designed, manufactured and validated independently of each other in accordance with the standardized interface system, thereby accelerating the development process. As new bodies are designed to mate with the previously manufactured and validated chassis, the newly designed bodies may be developed more quickly in response to market demand and attached to the previously validated chassis.

6 Claims, 25 Drawing Sheets

U.S. PATENT DOCUMENTS

| | | | |
|---|---|---|---|
| 5,409,283 A | 4/1995 | Ban | |
| 5,418,437 A | 5/1995 | Couture et al. | |
| 5,534,848 A | 7/1996 | Steel et al. | 340/517 |
| 5,606,503 A | 2/1997 | Shal et al. | 364/423.098 |
| 5,609,353 A | 3/1997 | Watson | 280/707 |
| 5,641,031 A | 6/1997 | Riemer et al. | 180/65.3 |
| 5,725,350 A | 3/1998 | Christenson | 414/491 |
| 5,813,487 A | 9/1998 | Lee et al. | 180/65.1 |
| 5,823,636 A | 10/1998 | Parker et al. | 303/3 |
| 6,059,058 A | 5/2000 | Dower | 180/65.3 |
| 6,097,286 A | 8/2000 | Discenzo | |
| 6,102,151 A | 8/2000 | Shimizu et al. | |
| 6,176,341 B1 | 1/2001 | Ansari | 180/402 |
| 6,195,999 B1 | 3/2001 | Arnold et al. | 60/649 |
| 6,208,923 B1 | 3/2001 | Hommel | 701/42 |
| 6,219,604 B1 | 4/2001 | Dilger et al. | 701/41 |
| 6,223,843 B1 | 5/2001 | O'Connell et al. | 180/65.3 |
| 6,305,758 B1 | 10/2001 | Hageman et al. | 303/115.2 |
| 6,318,494 B1 | 11/2001 | Pattok | 180/402 |
| 6,321,145 B1 | 11/2001 | Rajashekara | 701/22 |
| 6,370,460 B1 | 4/2002 | Kaufmann et al. | 701/41 |
| 6,378,637 B1 | 4/2002 | Ono et al. | 180/65.3 |
| 6,390,565 B1 | 5/2002 | Riddiford et al. | 303/3 |
| 6,394,207 B1 | 5/2002 | Skala | 180/65.2 |
| 6,394,218 B1 | 5/2002 | Heitzer | 180/402 |
| 6,394,537 B1 | 5/2002 | DeRees | |
| 6,397,134 B1 | 5/2002 | Shal et al. | 701/37 |
| 6,408,966 B1 | 6/2002 | Benz et al. | |
| 6,424,900 B1 | 7/2002 | Murray et al. | |
| 6,435,584 B1 | 8/2002 | Bonnville | |
| 6,488,345 B1 | 12/2002 | Woody et al. | |
| 6,836,943 B1 * | 1/2005 | Chernoff et al. | 29/402.08 |
| 2001/0029408 A1 | 10/2001 | Murray et al. | |

FOREIGN PATENT DOCUMENTS

| | | |
|---|---|---|
| GB | 2060514 | 5/1981 |
| GB | 2 178 701 A | 2/1987 |
| GB | 2 207 096 A | 1/1989 |
| GB | 2207096 A * | 1/1989 |

OTHER PUBLICATIONS

Sanket Amberkar, et al., "A System-Safety Process for by-Wire Automotive Systems", SAE Technical Paper, 2000-01-1056, SAE World Congress, Detroit, MI, Mar. 2000.

Edmunds.com Editors, "Why Drive-by-Wire?", The New York Times, Nov. 29, 2000.

* cited by examiner

METHOD OF DESIGNING AND MANUFACTURING VEHICLES

CROSS-REFERENCE TO RELATED APPLICATIONS

This application claims the benefit of U.S. Provisional Applications 60/314,501 and 60/337,994, filed Aug. 23, 2001 and Dec. 7, 2001, both of which are hereby incorporated by reference in their entireties.

TECHNICAL FIELD

The present invention relates to an accelerated vehicle development process wherein a standardized interface system is established so that chassis and bodies may be developed independently in accordance with the standardized interface system, thereby accelerating development.

BACKGROUND OF THE INVENTION

Mobility, being capable of moving from place to place or of moving quickly from one state to another, has been one of the ultimate goals of humanity throughout recorded history. The automobile has likely done more in helping individuals achieve that goal than any other development. Since its inception, societies around the globe have experienced rates of change in their manner of living that are directly related to the percentage of motor vehicle owners among the population.

Prior art automobiles and light trucks include a body, the function of which is to contain and protect passengers and their belongings. Bodies are connected to the numerous mechanical, electrical, and structural components that, in combination with a body, comprise a fully functional vehicle. The nature of the prior art connections between a vehicle body and vehicular componentry may result in certain inefficiencies in the design, manufacture, and use of vehicles. Three characteristics of prior art body connections that significantly contribute to these inefficiencies are the quantity of connections; the mechanical nature of many of the connections; and the locations of the connections on the body and on the componentry.

In the prior art, the connections between a body and componentry are numerous. Each, connection involves at least one assembly step when a vehicle is assembled; it is therefore desirable to reduce the number of connections to increase assembly efficiency. The connections between a prior art body and prior art vehicular componentry include multiple load-bearing connectors to physically fasten the body to the other components, such as bolts and brackets; electrical connectors to transmit electrical energy to the body from electricity-generating components and to transmit data from sensors that monitor the status of the componentry; mechanical control linkages, such as the steering column, throttle cable, and transmission selector; and ductwork and hoses to convey fluids such as heated and cooled air from an HVAC unit to the body for the comfort of passengers.

Many of the connections in the prior art, particularly those connections that transmit control signals, are mechanical linkages. For example, to control the direction of the vehicle, a driver sends control signals to the steering system via a steering column. Mechanical linkages result in inefficiencies, in part, because different driver locations in different vehicles require different mechanical linkage dimensions and packaging. Thus, new or different bodies often cannot use "off-the-shelf" components and linkages. Componentry for one vehicle body configuration is typically not compatible for use with other vehicle body configurations. Furthermore, if a manufacturer changes the design of a body, a change in the design of the mechanical linkage and the component to which it is attached may be required. The change in design of the linkages and components requires modifications to the tooling that produces the linkages and components.

The location of the connections on prior art vehicle bodies and componentry also results in inefficiencies. In prior art body-on-frame architecture, connection locations on the body are often not exposed to an exterior face of the body, and are distant from corresponding connections on the componentry; therefore, long connectors such as wiring harnesses and cables must be routed throughout the body from componentry. The vehicle body of a fully-assembled prior art vehicle is intertwined with the componentry and the connection devices, rendering separation of the body from its componentry difficult and labor-intensive, if not impossible. The use of long connectors increases the number of assembly steps required to attach a vehicle to its componentry.

Furthermore, prior art vehicles typically have internal combustion engines that have a height that is a significant proportion of the overall vehicle height. Prior art vehicle bodies are therefore designed with an engine compartment that occupies about a third of the front (or sometimes the rear) of the body length. Compatibility between an engine and a vehicle body requires that the engine fit within the body's engine compartment without physical part interference. Moreover, compatibility between a prior art chassis with an internal combustion engine and a vehicle body requires that the body have an engine compartment located such that physical part interference is avoided. For example, a vehicle body with an engine compartment in the rear is not compatible with a chassis with an engine in the front.

SUMMARY OF THE INVENTION

A self-contained chassis has substantially all of the mechanical, electrical, and structural componentry necessary for a fully functional vehicle, including at least an energy conversion system, a suspension and wheels, a steering system, and a braking system. The chassis has a simplified, and preferably standardized, interface with connection components to which bodies of substantially varying design can be attached. X-by-wire technology is utilized to eliminate mechanical control linkages.

As a result, the amount of time and resources required to design and manufacture new vehicle bodies are reduced. Body designs need only conform to the simple attachment interface of the chassis, eliminating the need to redesign or reconfigure expensive components.

Further, a multitude of body configurations share a common chassis, enabling economies of scale for major mechanical, electrical, and structural components.

Connection components, exposed and unobstructed, increase manufacturing efficiency because attachment of a body to the chassis requires only engagement of the connection components to respective complementary connection components on a vehicle body.

Vehicle owners can increase the functionality of their vehicles at a lower cost than possible with the prior art because a vehicle owner need buy only one chassis upon which to mount a multitude of body styles.

The invention provides an accelerated vehicle development process as a result of the standardized interface which enables attachment of many different types of bodies to a single chassis design. The accelerated vehicle development process includes establishing or predefining a common, standardized interface system wherein chassis are provided with body connection components arranged to facilitate selective attachment of any of a plurality of different body types to the chassis, and bodies are designed and manufactured to conform to the standardized interface system for attachment to the chassis. Accordingly, chassis and bodies may be designed independently and/or in parallel (i.e. concurrently) so that the vehicle development process is accelerated. The chassis and bodies may be manufactured and validated independently, which eliminates the need to revalidate the entire vehicle for each redesign.

The method of designing and manufacturing vehicles includes: (A) establishing a standardized body-chassis interface system wherein vehicle chassis are provided with a body attachment interface having load bearing body-retention couplings and at least one control signal receiving electrical connector positioned at predetermined locations in the body attachment interface to receive different types of vehicle bodies, and wherein different types of vehicle bodies are provided with a chassis attachment interface having mechanical chassis-retention couplings complementary to the load bearing body-retention couplings and at least one control signal transmitting electrical connector complementary to the control signal receiving electrical connector at complementary predetermined locations in the chassis attachment interface; (B) designing and manufacturing vehicle chassis adhering to the standardized body-chassis interface system; (C) concurrently with the designing and manufacturing of vehicle chassis, and independently thereof, designing and manufacturing vehicle bodies adhering to the standardized body-chassis interface system.

Preferably, the designed and manufactured bodies include at least three body styles selected from the group consisting of sedans, pick-up trucks, convertibles, coupes, vans, station wagons, sport-utility vehicles, and other types of transports.

The chassis are designed and manufactured to include a structural frame; a suspension system mounted to the frame; at least three wheels rotatably mounted to the suspension system; an energy conversion system mounted to the structural frame, operably connected to at least one wheel, and controllable by wire; a by-wire braking system mounted to the frame and operably connected to at least one wheel; and a computer operatively connected to the energy conversion system and braking system.

The method may further include attaching one of the bodies to one of the chassis and, thereafter, designing and manufacturing different bodies having different body types than the attached body and configured to conform to the standardized interface system for attachment to the chassis.

The body may be characterized by having at least one electrical communication linkage (electrical connector) for communicating steering, braking and propulsion control signals to the chassis, and further characterized by the absence of mechanical communication linkages for communicating steering, braking and propulsion signals to the chassis. Preferably, the standardized interface system includes no more than one control signal transmitting electrical connector on the body to provide communication signals to a corresponding electrical connector on the chassis. Also, preferably the energy conversion system is a fuel cell. The chassis may also include wheel motors on at least two of the wheels.

The above object, features, advantages, and other objects, features, and advantages of the present invention are readily apparent from the following detailed description of the best modes for carrying out the invention when taken in connection with the accompanying drawings.

DESCRIPTION OF THE PREFERRED EMBODIMENTS

Figure 1:
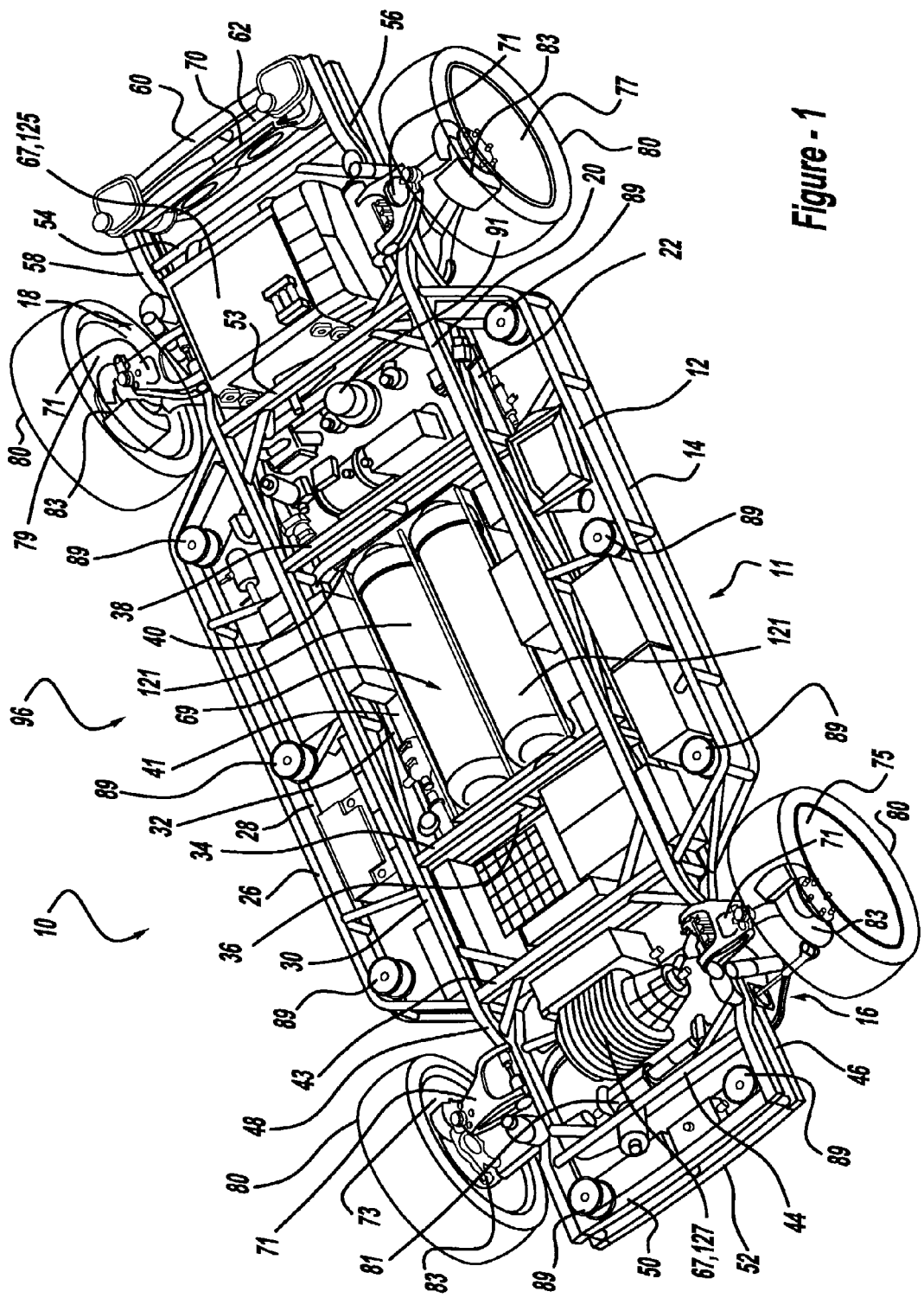
FIG. 1 is a schematic illustration in perspective view of a vehicle rolling platform according to an embodiment of the present invention.

Referring to FIG. 1, a vehicle chassis 10 in accordance with the invention, also referred to as the "rolling platform," includes a structural frame 11. The structural frame 11 depicted in FIG. 1 comprises a series of interconnected structural elements including upper and lower side structural elements 12 and 14 that comprise a "sandwich"-like construction. Elements 12 and 14 are substantially rigid tubular (or optionally solid), members that extend longitudinally between the front and rear axle areas 16, 18, and are positioned outboard relative to similar elements 20, 22. The front and rear ends of elements 12, 14 are angled inboard, extending toward elements 20 and 22 and connecting therewith prior to entering the axle areas 16, 18. For added strength and rigidity a number of vertical and angled structural elements extend between elements 12, 14, 20 and 22. Similar to the elements 12, 14, 20 and 22, which extend along the left side of the rolling platform 10, a family of structural elements 26, 28, 30 and 32 extend along the right side thereof.

Lateral structural elements 34, 36 extend between elements 20, 30 and 22, 32, respectively nearer the front axle area 16 and lateral structural elements 38, 40 extend between elements 20, 30 and 22, 32, respectively nearer the rear axle area 18, thereby defining a mid-chassis space 41. The front axle area 16 is defined in and around structural elements 43, 44 at the rear and front, and on the sides by structural elements 46, 48 which may be extensions of the elements 20, 22, 30, 32 or connected therewith. Forward of the front axle area, a forward space is defined between element 44 and elements 50, 52. The rear axle area 18 is defined in and around structural elements 53, 54 at the front and rear, and on the sides by structural elements 56, 58, which may be extensions of the elements 20, 22, 30, 32 or connected therewith. Rearward of the rear axle area 18, a rearward space is defined between element 54 and elements 60, 62. Alternatively, the rear axle area 18 or the rearward space may be elevated relative to the rest of the structural frame 11 if necessary to accommodate an energy conversion system, and the frame may include other elements to surround and protect an energy conversion system. The frame defines a plurality of open spaces between the elements described above. Those skilled in the art will recognize materials and fastening methods suitable for use in the structural frame. For example, the structural elements may be tubular, aluminum, and welded at their respective connections to other structural elements.

Figure 2:
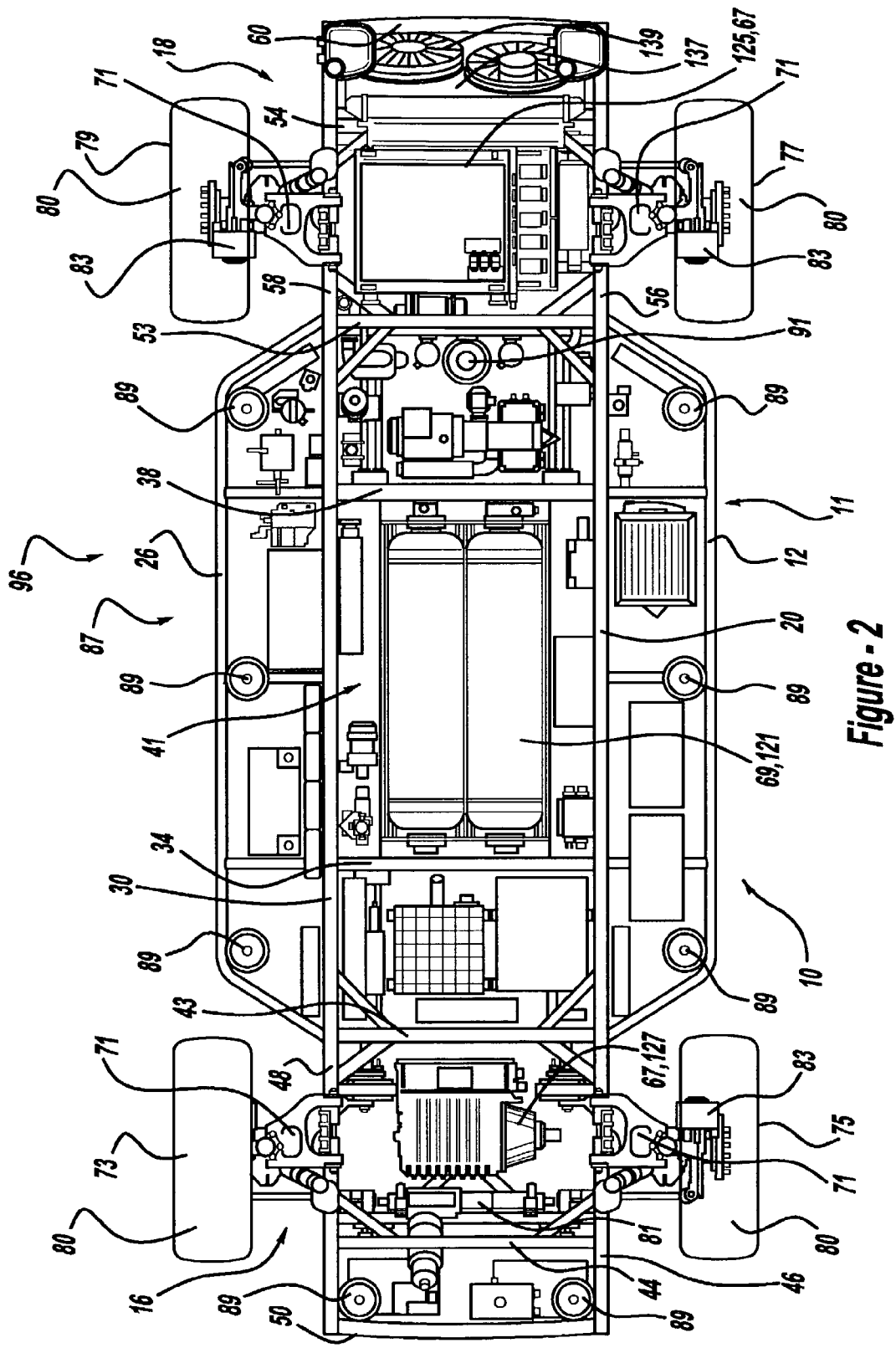
FIG. 2 is a top view schematic illustration of the vehicle rolling platform shown in FIG. 1.
Figure 3:
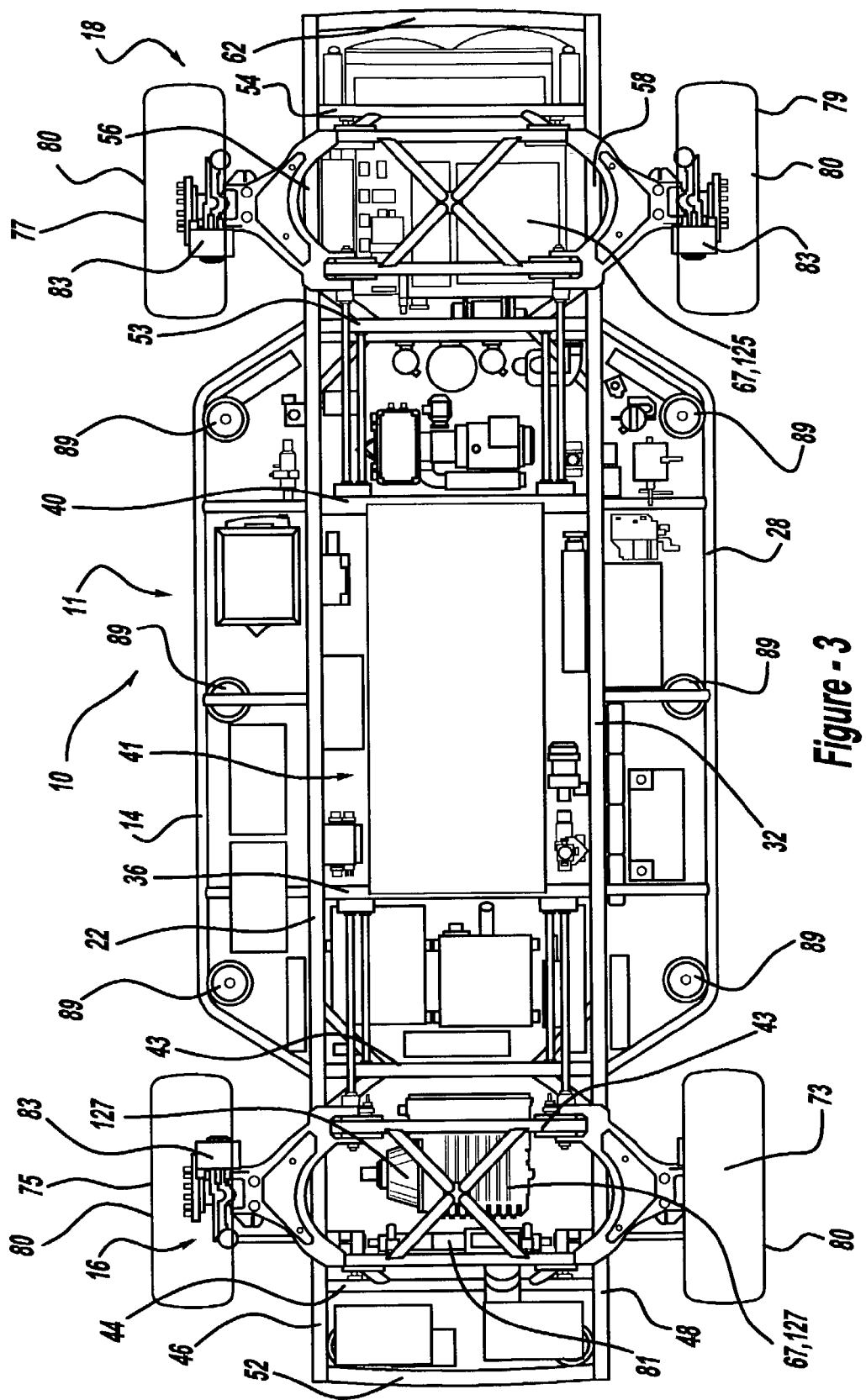
FIG. 3 is a bottom view schematic illustration of the vehicle rolling platform shown in FIGS. 1 and 2.
Figure 4:
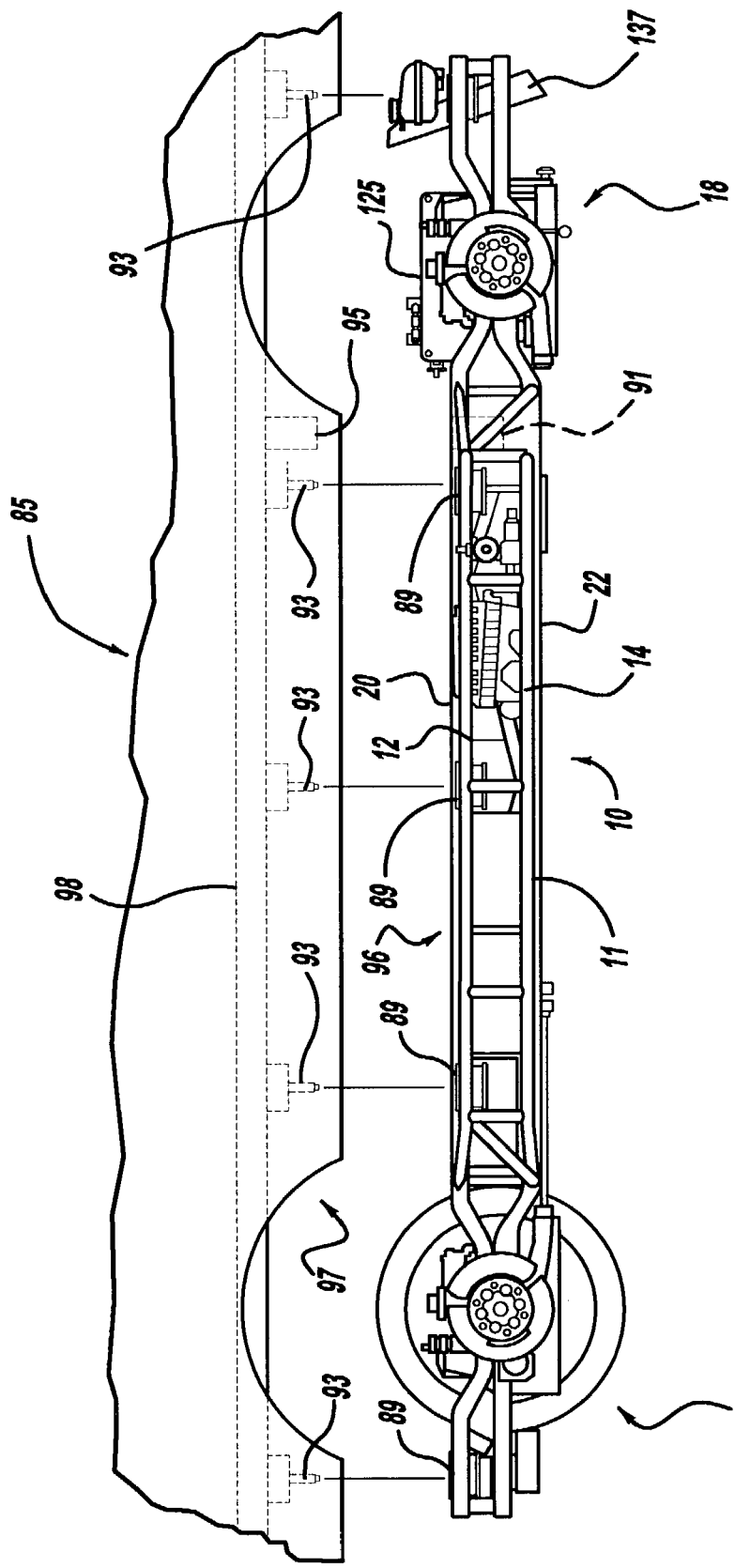
FIG. 4 is a schematic illustration in side view of a vehicle body pod and rolling platform attachment scenario according to the present invention that is useful with the embodiment of FIGS. 1–3.

The structural frame 11 provides a rigid structure to which an energy conversion system 67, energy storage system 69, suspension system 71 with wheels 73, 75, 77, 79 (each wheel having a tire 80), steering system 81, and braking system 83 are mounted, as shown in FIGS. 1–3, and is configured to support an attached body 85, as shown in FIG. 4. A person of ordinary skill in the art will recognize that the structural frame 11 can take many different forms, in addition to the cage-like structure of the embodiment depicted in FIGS. 1–3. For example, the structural frame 11 can be a traditional automotive frame having two or more longitudinal structural members spaced a distance apart from each other, with two or more transverse structural members spaced apart from each other and attached to both longitudinal structural members at their ends. Alternatively, the structural frame may also be in the form of a "belly pan," wherein integrated rails and cross members are formed in sheets of metal or other suitable material, with other formations to accommodate various system components. The structural frame may also be integrated with various chassis components.

Referring to FIG. 2, a body attachment interface 87 is defined as the sum of all body connection components, i.e., connective elements that function to operably mate a vehicle body to the chassis 10. The body connection components of the preferred embodiment include a plurality of load-bearing body-retention couplings 89 mounted with respect to the structural frame 11 and a single electrical connector 91.

As shown in FIG. 4, the load-bearing body-retention couplings 89 are engageable with complementary attachment couplings 93 on a vehicle body 85 and function to physically fasten the vehicle body 85 to the chassis 10. Those skilled in the art will recognize that a multitude of fastening and locking elements may be used and fall within the scope of the claimed invention. The load-bearing body-retention couplings 89 are preferably releasably engageable with complementary couplings, though non-releasably engageable couplings such as weld flanges or riveting surfaces may be employed within the scope of the claimed invention. Ancillary fastening elements may be used as lock downs in conjunction with the load-bearing body-retention couplings. Load-bearing surfaces without locking or fastening features on the chassis 10 may be used with the load-bearing body-retention couplings 89 to support the weight of an attached vehicle body 85. In the preferred embodiment, the load-bearing body-retention couplings 89 include support brackets with bolt holes. Rubber mounts (not shown) located on the support brackets dampen vibrations transmitted between the body and the chassis. Alternatively, hard mounts may be employed for body-retention couplings.

The electrical connector 91 is engageable with a complementary electrical connector 95 on a vehicle body 85. The electrical connector 91 of the preferred embodiment may perform multiple functions, or select combinations thereof. First, the electrical connector 91 may function as an electrical power connector, i.e., it may be configured to transfer electrical energy generated by components on the chassis 10 to a vehicle body 85 or other non-chassis destination. Second, the electrical connector 91 may function as a control signal receiver, i.e., a device configured to transfer control signals from a non-chassis source to controlled systems including the energy conversion system, steering system, and braking system. Third, the electrical connector 91 may function as a feedback signal conduit through which feedback signals are made available to a vehicle driver. Fourth, the electrical connector 91 may function as an external programming interface through which software containing algorithms and data may be transmitted for use by controlled systems. Fifth, the electrical connector may function as an information conduit through which sensor information and other information is made available to a vehicle driver. The electrical connector 91 may thus function as a communications and power "umbilical" port through which all communications between the chassis 10 and an attached vehicle body 85 are transmitted. Electrical connectors include devices configured to operably connect one or more electrical wires with other electrical wires. The wires may be spaced a distance apart to avoid any one wire causing signal interference in another wire operably connected to an electrical connector or for any reason that wires in close proximity may not be desirable.

If one electrical connector performing multiple functions is not desirable, for example, if a cumbersome wire bundle is required, or power transmission results in control signal interference, the body attachment interface 87 may include a plurality of electrical connectors 91 engageable with a plurality of complementary electrical connectors 95 on a vehicle body 85, with different connectors performing different functions. A complementary electrical connector 95 performs functions complementary to the function of the electrical connector with which it engages, for example, functioning as a control signal transmitter when engaged with a control signal receiver.

Referring again to FIGS. 1–3, the energy conversion system 67, energy storage system 69, steering system 81, and braking system 83, are configured and positioned on the chassis 10 to minimize the overall vertical height of the chassis 10 and to maintain a substantially horizontal upper chassis face 96. A face of an object is an imaginary surface that follows the contours of the object that face, and are directly exposed to, a particular direction. Thus, the upper chassis face 96 is an imaginary surface that follows the upwardly facing and exposed contours of the chassis frame 11 and systems mounted therein. Matable vehicle bodies have a corresponding lower body face 97 that is an imaginary surface that follows the downwardly facing and exposed contours of the body 85, as shown in FIG. 4.

Referring again to FIGS. 1–3, the structural frame 11 has a height defined as the vertical distance between its highest point (the top of structural element 20) and its lowest point (the bottom of structural element 22). In the preferred embodiment, the structural frame height is approximately 11 inches. To achieve a substantially horizontal upper chassis face 96, the energy conversion system 67, energy storage system 69, steering system 81, and braking system 83 are distributed throughout the open spaces and are configured, positioned, and mounted to the structural frame 11 such that no part of the energy conversion system 67, energy storage system 69, steering system 81, or braking system 83, extends or protrudes above the structural frame 11 more than 50% of the structural frame's 11 height, or above the top of any of the tires 80. The substantially horizontal upper chassis face 96 enables the attached vehicle body 85 to have a passenger area that extends the length of the chassis, unlike prior art bodies that have an engine compartment to accommodate a vertically-protruding internal combustion engine.

Most of the powertrain load is evenly distributed between the front and rear of the chassis so there is a lower center of gravity for the whole vehicle without sacrificing ground clearance, thereby enabling improved handling while resisting rollover forces.

Referring again to FIG. 4, the preferred embodiment of the rolling platform 10 is configured such that the lower body face 97 of a matable vehicle body 85 is positioned closely adjacent to the upper chassis face 96 for engagement with the rolling platform 10. The body connection components have a predetermined spatial relationship relative to one another, and are sufficiently positioned, exposed, and unobstructed such that when a vehicle body 85 having complementary connection components (complementary attachment couplings 93 and a complementary electrical connector 95) in the same predetermined spatial relationship as the body connection components is sufficiently positioned relative to the upper chassis face 96 of a chassis 10 of the invention, the complementary connection components are adjacent to corresponding body connection components and ready for engagement, as depicted in FIG. 4. In the context of the present invention, a body connection component having a protective covering is exposed and unobstructed if the protective covering is removable or retractable.

Figure 5:
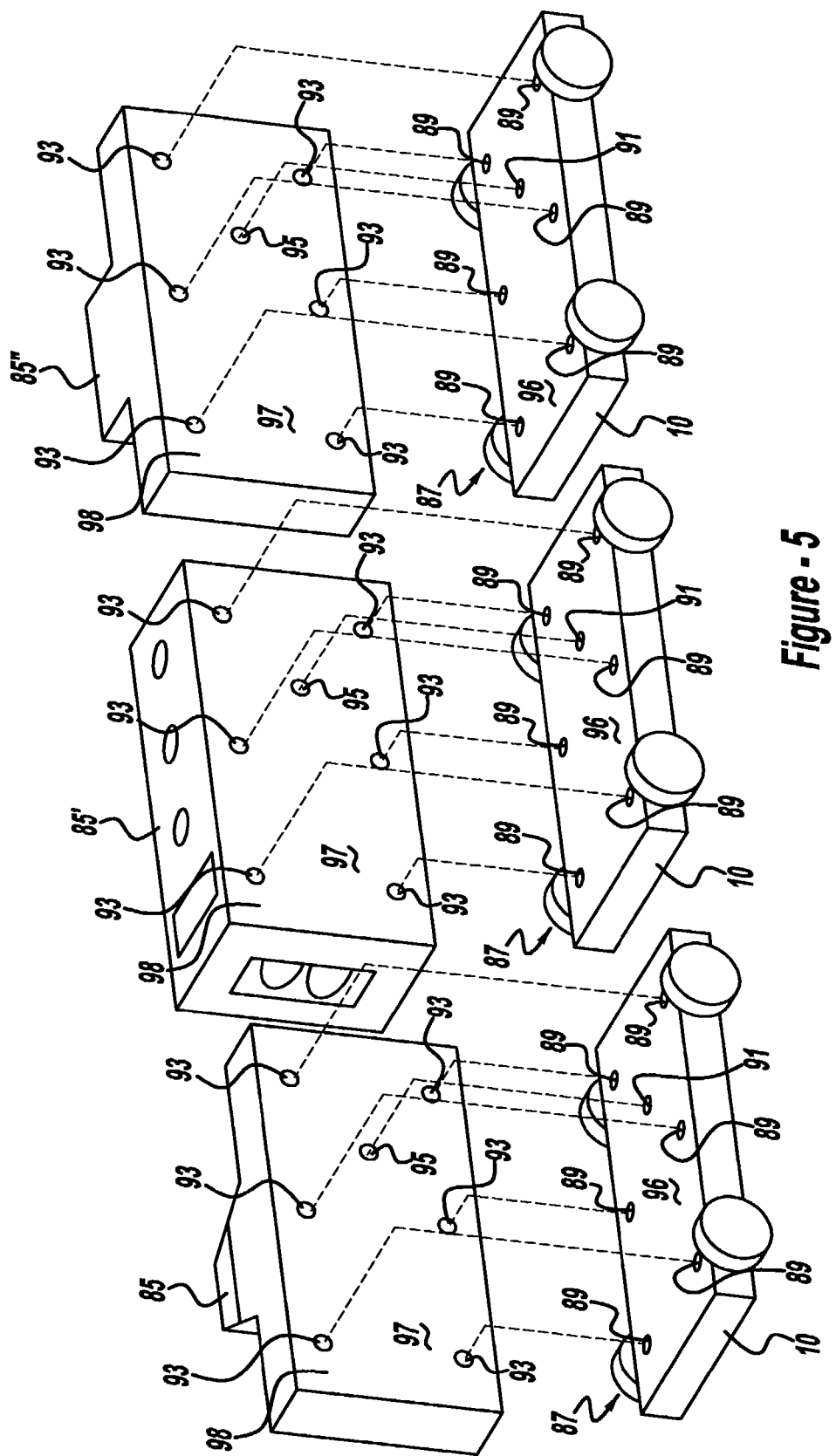
FIG. 5 is a schematic illustration of a vehicle body pod and rolling platform attachment scenario, wherein body pods of differing configurations are each attachable to identical rolling platforms.

Each body connection component has a spatial relationship relative to each of the other body connection components that can be expressed, for example, as a vector quantity. Body connection components and complementary connection components have the same predetermined spatial relationship if the vector quantities that describe the spatial relationship between a body connection component and the other body connection components to be engaged also describe the spatial relationship between a corresponding complementary connection component and the other complementary connection components to be engaged. For example, the spatial relationship may be defined as follows: a first body connection component is spaced a distance $Ax+By$ from a reference point; a second body connection component is spaced a distance $Cx+Dy$ from the reference point; a third body connection component is spaced a distance $Ex+Fy$ from the reference point, etc. Corresponding complementary connection components in the same predetermined spatial relationship are spaced in a mirror image relationship in the lower body face, as depicted in FIGS. 4 and 5. A protective covering (not shown) may be employed to protect any of the body connection components.

The body connection components and the complementary connection components are preferably adjacent without positional modification when a vehicle body 85 is sufficiently positioned relative to a chassis 10 of the invention; however, in the context of the present invention, the body connection components may be movable relative to each other within a predetermined spatial relationship to accommodate build tolerances or other assembly issues. For example, an electrical connector may be positioned and operably connected to a signal-carrying cable. The cable may be fixed relative to the structural frame at a point six inches from the electrical connector. The electrical connector will thus be movable within six inches of the fixed point on the cable. A body connection component is considered adjacent to a complementary connection component if one or both are movable within a predetermined spatial relationship so as to be in contact with each other.

Referring to FIG. 5, the body-attachment interface of the claimed invention enables compatibility between the chassis 10 and different types of bodies 85, 85', 85" having substantially different designs. Bodies 85, 85', 85" having a common base 98 with complementary attachment couplings 93 and complementary electrical connectors 95 in the same predetermined spatial relationship with one another as the predetermined spatial relationship between body connection components on the body-attachment interface 87, are each matable with the chassis 10 by positioning the body 85, 85', 85" relative to the chassis 10 such that each complementary attachment coupling 93 is adjacent to a load-bearing body-retention coupling 89, and the complementary electrical connector 95 is adjacent to the electrical connector 91. In accordance with the preferred embodiment of the present invention, all bodies and chassis comply with this common, standardized interface system, thereby enabling a wide array of different body types and styles to be attached to a single chassis design. The substantially horizontal upper chassis face 96 also facilitates compatibility between the rolling platform 10 and a multitude of differently-configured body styles. The common base 98 functions as a body structural unit and forms the lower body face 97 in the preferred embodiment. FIG. 5 schematically depicts a sedan 85, a van 85', and a pickup truck 85" each having a common base 98.

The body connection components are preferably sufficiently exposed at a chassis face to facilitate attachment to complementary connection components on a matable vehicle body. Similarly, complementary connection components on a matable vehicle body are sufficiently exposed at a body face to facilitate attachment to body connection components on a vehicle chassis. In the preferred embodiment of the invention, the body connection components are located at or above the upper chassis face for engagement with complementary connection components located at or below a lower body face.

It is within the scope of the claimed invention to employ a connection device to engage or operably connect a body connection component with a distant complementary connection component, in the situation where a vehicle body does not have complementary connection components in the same predetermined spatial relationship as the body connection components on a vehicle chassis. For example, a cable having two connectors, one connector engageable with the electrical connector on a body attachment interface and the other connector engageable with a complementary connector on a matable vehicle body, may be used to operably connect the electrical connector and the complementary connector.

The bodies 85, 85', 85" shown schematically in FIG. 5 each use all of the body connection components on the vehicle chassis 10. However, within the scope of the claimed invention, a chassis may have more body connection components than are actually mated with a vehicle body. For example, a chassis may have ten load-bearing body-retention couplings, and be matable with a body that engages only five of the ten load-bearing body-retention couplings. Such an arrangement is particularly useful when an attachable body is of a different size than the chassis. For example, a matable body may be smaller than a chassis. Similarly, and within the scope of the claimed invention, a body may be modular such that separate body components are independently connected to the vehicle chassis by the load-bearing body-retention couplings.

A body may have more complementary connection components than are engageable with the body connection components of a particular chassis. Such an arrangement may be employed to enable a particular body to be matable to multiple chassis each having a different predetermined spatial relationship among its body connection components.

The load-bearing body-retention couplings 89 and the electrical connector 91 are preferably releasably engageable without damage to either an attached body 85 or the chassis 10, thereby enabling removal of one body 85 from the chassis 10 and installation of a different body 85', 85" on the chassis 10.

In the preferred embodiment, the body-attachment interface 87 is characterized by the absence of any mechanical control signal-transmission linkages and any couplings for attaching mechanical control signal-transmission linkages. Mechanical control linkages, such as steering columns, limit the compatibility between a chassis and bodies of different configurations.

Referring to FIG. 1, the steering system 81 is housed in the front axle area 16 and is operably connected to the front wheels 73, 75. Preferably, the steering system 81 is responsive to non-mechanical control signals. In the preferred embodiment, the steering system 81 is by-wire. A by-wire system is characterized by control signal transmission in electrical form. In the context of the present invention, "by-wire" systems, or systems that are controllable "by-wire," include systems configured to receive control signals in electronic form via a control signal receiver on the body attachment interface 87, and respond in conformity to the electronic control signals.

Figure 6:
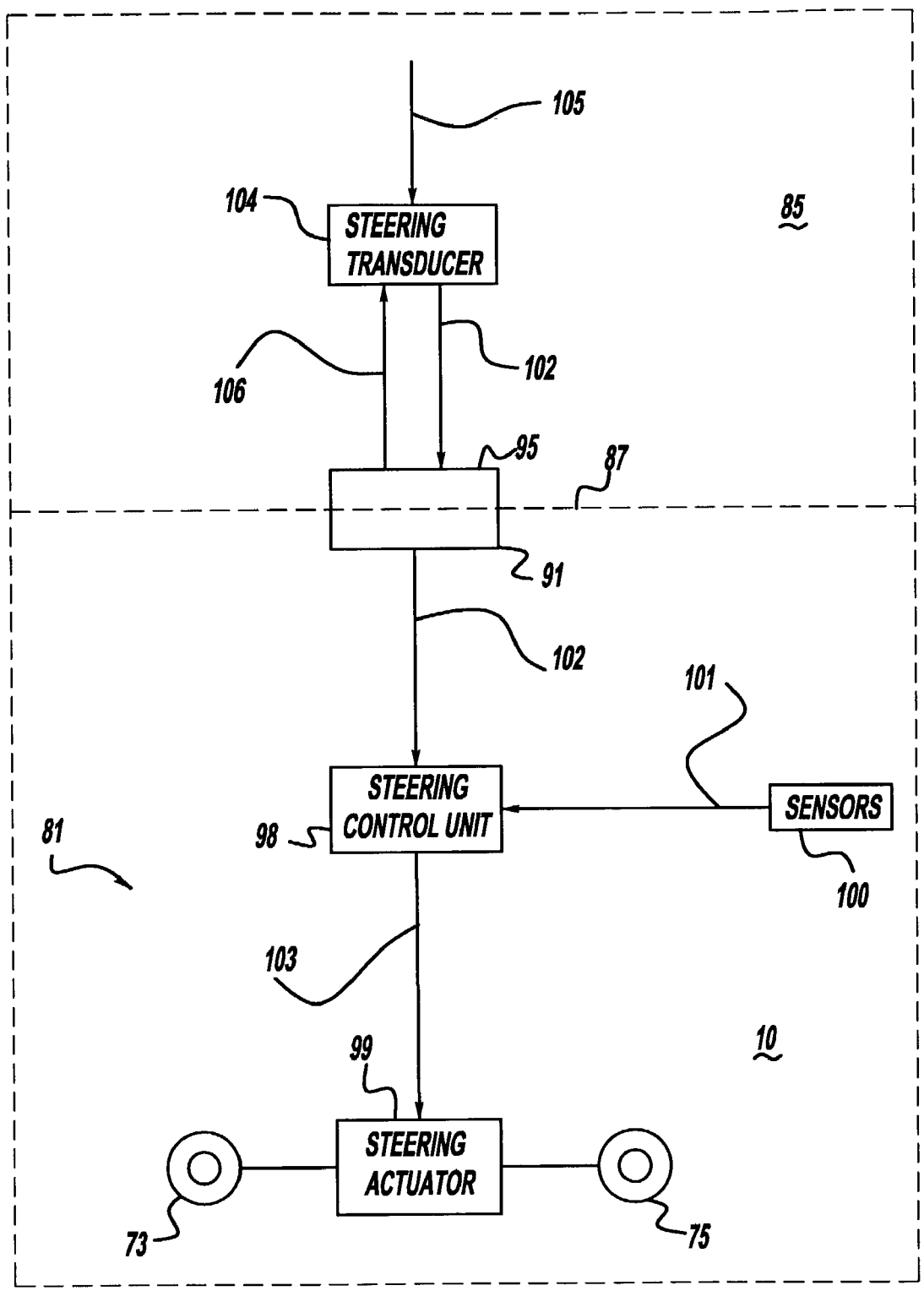
FIG. 6 is a schematic illustration of a steering system for use with the rolling platform and body pod shown in FIG. 4.

Referring to FIG. 6, the by-wire steering system 81 of the preferred embodiment includes a steering control unit 98, and a steering actuator 99. Sensors 100 are located on the chassis 10 and transmit sensor signals 101 carrying information concerning the state or condition of the chassis 10 and its component systems. The sensors 100 may include position sensors, velocity sensors, acceleration sensors, pressure sensors, force and torque sensors, flow meters, temperature sensors, etc. The steering control unit 98 receives and processes sensor signals 101 from the sensors 100 and electrical steering control signals 102 from the electrical connector 91, and generates steering actuator control signals 103 according to a stored algorithm. A control unit typically includes a microprocessor, ROM and RAM and appropriate input and output circuits of a known type for receiving the various input signals and for outputting the various control commands to the actuators. Sensor signals 101 may include yaw rate, lateral acceleration, angular wheel velocity, tie-rod force, steering angle, chassis velocity, etc.

The steering actuator 99 is operably connected to the front wheels 73, 75 and configured to adjust the steering angle of the front wheels 73, 75 in response to the steering actuator control signals 103. Actuators in a by-wire system transform electronic control signals into a mechanical action or otherwise influence a system's behavior in response to the electronic control signals. Examples of actuators that may be used in a by-wire system include electromechanical actuators such as electric servomotors, translational and rotational solenoids, magnetorheological actuators, electrohydraulic actuators, and electrorheological actuators. Those skilled in the art will recognize and understand mechanisms by which the steering angle is adjusted. In the preferred embodiment, the steering actuator 99 is an electric drive motor configured to adjust a mechanical steering rack.

Referring again to FIG. 6, the preferred embodiment of the chassis 10 is configured such that it is steerable by any source of compatible electrical steering control signals 102 connected to the electrical connector 91. FIG. 6 depicts a steering transducer 104 located on an attached vehicle body 85 and connected to a complementary electrical connector 95. Transducers convert the mechanical control signals of a vehicle driver to non-mechanical control signals. When used with a by-wire system, transducers convert the mechanical control signals to electrical control signals usable by the by-wire system. A vehicle driver inputs control signals in mechanical form by turning a wheel, depressing a pedal, pressing a button, or the like. Transducers utilize sensors, typically position and force sensors, to convert the mechanical input to an electrical signal. In the preferred embodiment, a +/−20 degree slide mechanism is used for driver input, and an optical encoder is used to read input rotation.

The complementary electrical connector 95 is coupled with the electrical connector 91 of the body attachment interface 87. The steering transducer 104 converts vehicle driver-initiated mechanical steering control signals 105 to electrical steering control signals 102 which are transmitted via the electrical connector 91 to the steering control unit 98. In the preferred embodiment, the steering control unit 98 generates steering feedback signals 106 for use by a vehicle driver and transmits the steering feedback signals 106 through the electrical connector 91. Some of the sensors 100 monitor linear distance movement of the steering rack and vehicle speed. This information is processed by the steering control unit 98 according to a stored algorithm to generate the steering feedback signals 106. A torque control motor operably connected to the slide mechanism receives the steering feedback signals 106 and is driven in the opposite direction of the driver's mechanical input.

In the context of the present invention, a "by-wire" system may be an actuator connected directly to an electrical connector in the body attachment interface. An alternative by-wire steering system 81' within the scope of the claimed invention is depicted schematically in FIG. 7, wherein like reference numbers refer to like components from FIG. 6. A steering actuator 99 configured to adjust the steering angle of the front wheels 73, 75 is connected directly to the electrical connector 91. In this embodiment, a steering control unit 98' and a steering transducer 104 may be located in an attached vehicle body 85. The steering transducer 104 would transmit electrical steering control signals 102 to the steering control unit 98', and the steering control unit 98' would transmit steering actuator control signals 103 to the steering actuator 99 via the electrical connector 91. Sensors 100 positioned on the chassis 10 transmit sensor signals 101 to the steering control unit 98' via the electrical connector 91 and the complementary electrical connector 95.

Examples of steer-by-wire systems are described in U.S. Pat. No. 6,176,341, issued Jan. 23, 2001 to Delphi Technologies, Inc; U.S. Pat. No. 6,208,923, issued Mar. 27, 2001 to Robert Bosch GmbH; U.S. Pat. No. 6,219,604, issued Apr. 17, 2001 to Robert Bosch GmbH; U.S. Pat. No. 6,318,494, issued Nov. 20, 2001 to Delphi Technologies, Inc.; U.S. Pat. No. 6,370,460, issued Apr. 9, 2002 to Delphi Technologies, Inc.; and U.S. Pat. No. 6,394,218, issued May 28, 2002 to TRW Fahrwerksysteme GmbH & Co. KG; which are hereby incorporated by reference in their entireties.

The steer-by-wire system described in U.S. Pat. No. 6,176,341 includes a position sensor for sensing angular position of a road wheel, a hand-operated steering wheel for controlling direction of the road wheel, a steering wheel sensor for sensing position of the steering wheel, a steering wheel actuator for actuating the hand-operated steering wheel, and a steering control unit for receiving the sensed steering wheel position and the sensed road wheel position and calculating actuator control signals, preferably including a road wheel actuator control signal and a steering wheel actuator control signal, as a function of the difference between the sensed road wheel position and the steering wheel position. The steering control unit commands the road wheel actuator to provide controlled steering of the road wheel in response to the road wheel actuator control signal. The steering control unit further commands the steering wheel actuator to provide feedback force actuation to the hand-operated steering wheel in response to the steering wheel control signal. The road wheel actuator control signal and steering wheel actuator control signal are preferably scaled to compensate for difference in gear ratio between the steering wheel and the road wheel. In addition, the road wheel actuator control signal and steering wheel actuator control signal may each have a gain set so that the road wheel control actuator signal commands greater force actuation to the road wheel than the feedback force applied to the steering wheel.

The steer-by-wire system described in U.S. Pat. No. 6,176,341 preferably implements two position control loops, one for the road wheel and one for the hand wheel. The position feedback from the steering wheel becomes a position command input for the road wheel control loop and the position feedback from the road wheel becomes a position command input for the steering wheel control loop. A road wheel error signal is calculated as the difference between the road wheel command input (steering wheel position feedback) and the road wheel position. Actuation of the road wheel is commanded in response to the road wheel error signal to provide controlled steering of the road wheel. A steering wheel error signal is calculated as the difference between the steering wheel position command (road wheel position feedback) and the steering wheel position. The handoperated steering wheel is actuated in response to the steering wheel error signal to provide force feedback to the hand-operated steering wheel.

The steering control unit of the '341 system could be configured as a single processor or multiple processors and may include a general-purpose microprocessor-based controller, that may include a commercially available off-the-shelf controller. One example of a controller is Model No. 87C196CA microcontroller manufactured and made available from Intel Corporation of Delaware. The steering control unit preferably includes a processor and memory for storing and processing software algorithms, has a clock speed of 16 MHz, two optical encoder interfaces to read position feedbacks from each of the actuator motors, a pulse width modulation output for each motor driver, and a 5-volt regulator.

U.S. Pat. No. 6,370,460 describes a steer-by-wire control system comprising a road wheel unit and a steering wheel unit that operate together to provide steering control for the vehicle operator. A steering control unit may be employed to support performing the desired signal processing. Signals from sensors in the road wheel unit, steering wheel unit, and vehicle speed are used to calculate road wheel actuator control signals to control the direction of the vehicle and steering wheel torque commands to provide tactile feedback to the vehicle operator. An Ackerman correction may be employed to adjust the left and right road wheel angles correcting for errors in the steering geometry to ensure that the wheels will track about a common turn center.

Referring again to FIG. 1, a braking system 83 is mounted to the structural frame 11 and is operably connected to the wheels 73, 75, 77, 79. The braking system is configured to be responsive to non-mechanical control signals. In the preferred embodiment, the braking system 83 is by-wire, as depicted schematically in FIG. 8, wherein like reference numbers refer to like components from FIGS. 6 and 7. Sensors 100 transmit sensor signals 101 carrying information concerning the state or condition of the chassis 10 and its component systems to a braking control unit 107. The braking control unit 107 is connected to the electrical connector 91 and is configured to receive electrical braking control signals 108 via the electrical connector 91. The braking control unit 107 processes the sensor signals 101 and the electrical braking control signals 108 and generates braking actuator control signals 109 according to a stored algorithm. The braking control unit 107 then transmits the braking actuator control signals 109 to braking actuators 110, 111, 112, 113 which act to reduce the angular velocity of the wheels 73, 75, 77, 79. Those skilled in the art will recognize the manner in which the braking actuators 110, 111, 112, 113 act on the wheels 73, 75, 77, 79. Typically, actuators cause contact between friction elements, such as pads and disc rotors. Optionally, an electric motor may function as a braking actuator in a regenerative braking system.

The braking control unit 107 may also generate braking feedback signals 114 for use by a vehicle driver and transmit the braking feedback signals 114 through the electrical connector 91. In the preferred embodiment, the braking actuators 110, 111, 112, 113 apply force through a caliper to a rotor at each wheel. Some of the sensors 100 measure the applied force on each caliper. The braking control unit 107 uses this information to ensure synchronous force application to each rotor.

Referring again to FIG. 8, the preferred embodiment of the chassis 10 is configured such that the braking system is responsive to any source of compatible electrical braking control signals 108. A braking transducer 115 may be located on an attached vehicle body 85 and connected to a complementary electrical connector 95 coupled with the electrical connector 91. The braking transducer 115 converts vehicle driver-initiated mechanical braking control signals 116 into electrical form and transmits the electrical braking control signals 106 to the braking control unit via the electrical connector 91. In the preferred embodiment, the braking transducer 115 includes two hand-grip type assemblies. The braking transducer 115 includes sensors that measure both the rate of applied pressure and the amount of applied pressure to the hand-grip assemblies, thereby converting mechanical braking control signals 116 to electrical braking control signals 108. The braking control unit 107 processes both the rate and amount of applied pressure to provide both normal and panic stopping.

Figure 7:
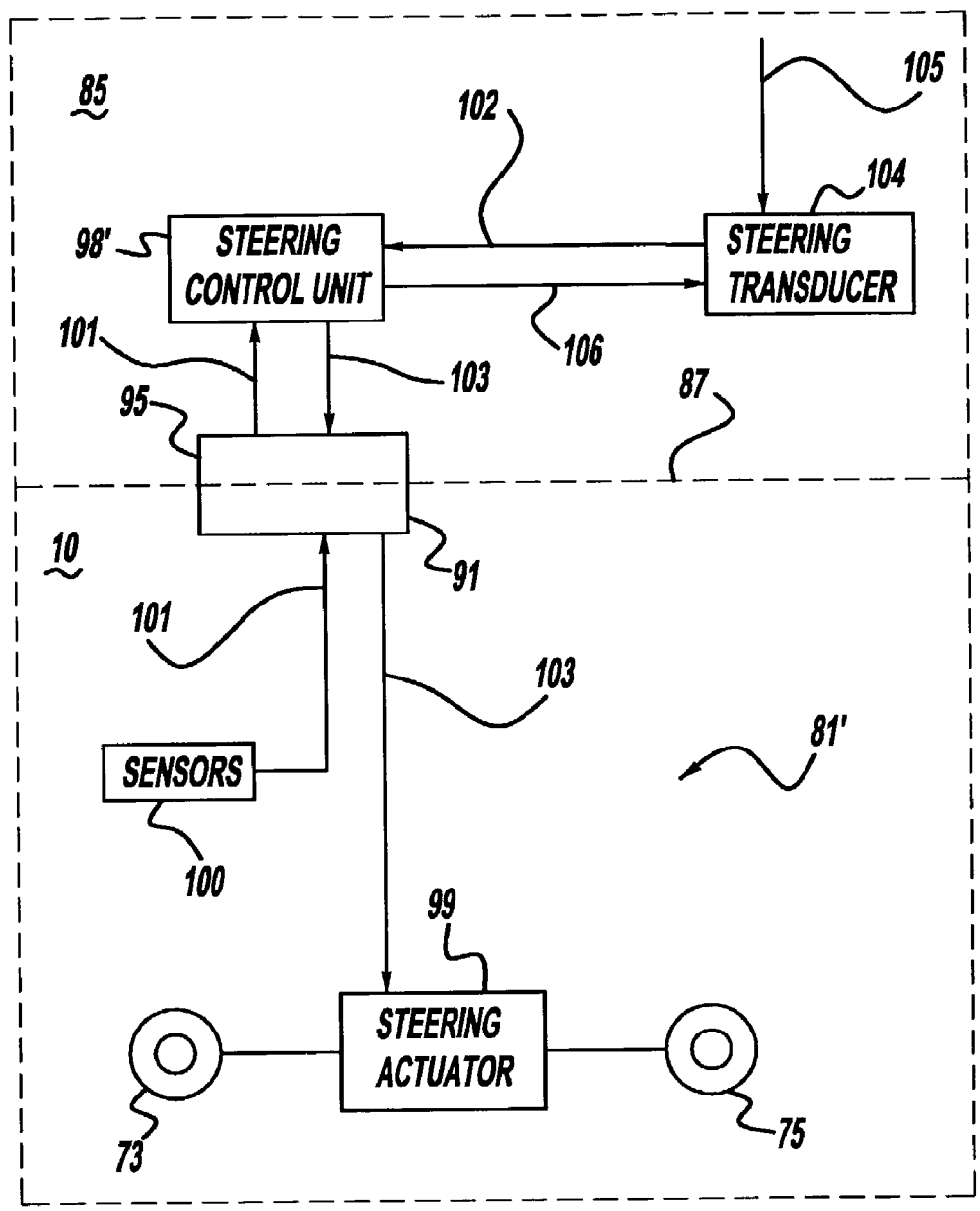
FIG. 7 is a schematic illustration of an alternative steering system for use in the rolling platform and body pod of FIG. 4.
Figure 8:
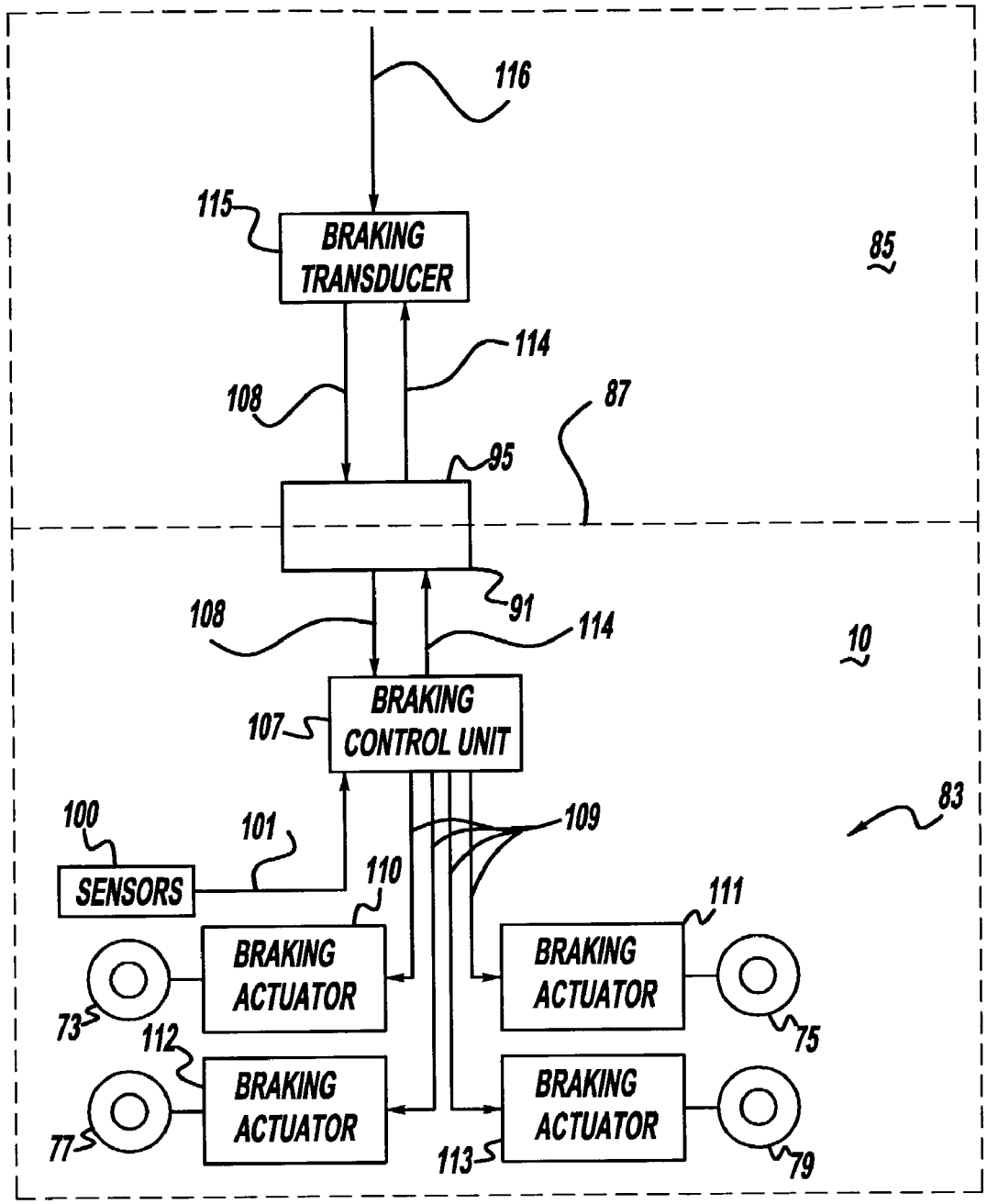
FIG. 8 is a schematic illustration of a braking system for use with the rolling platform and body pod of FIG. 4.
Figure 9:
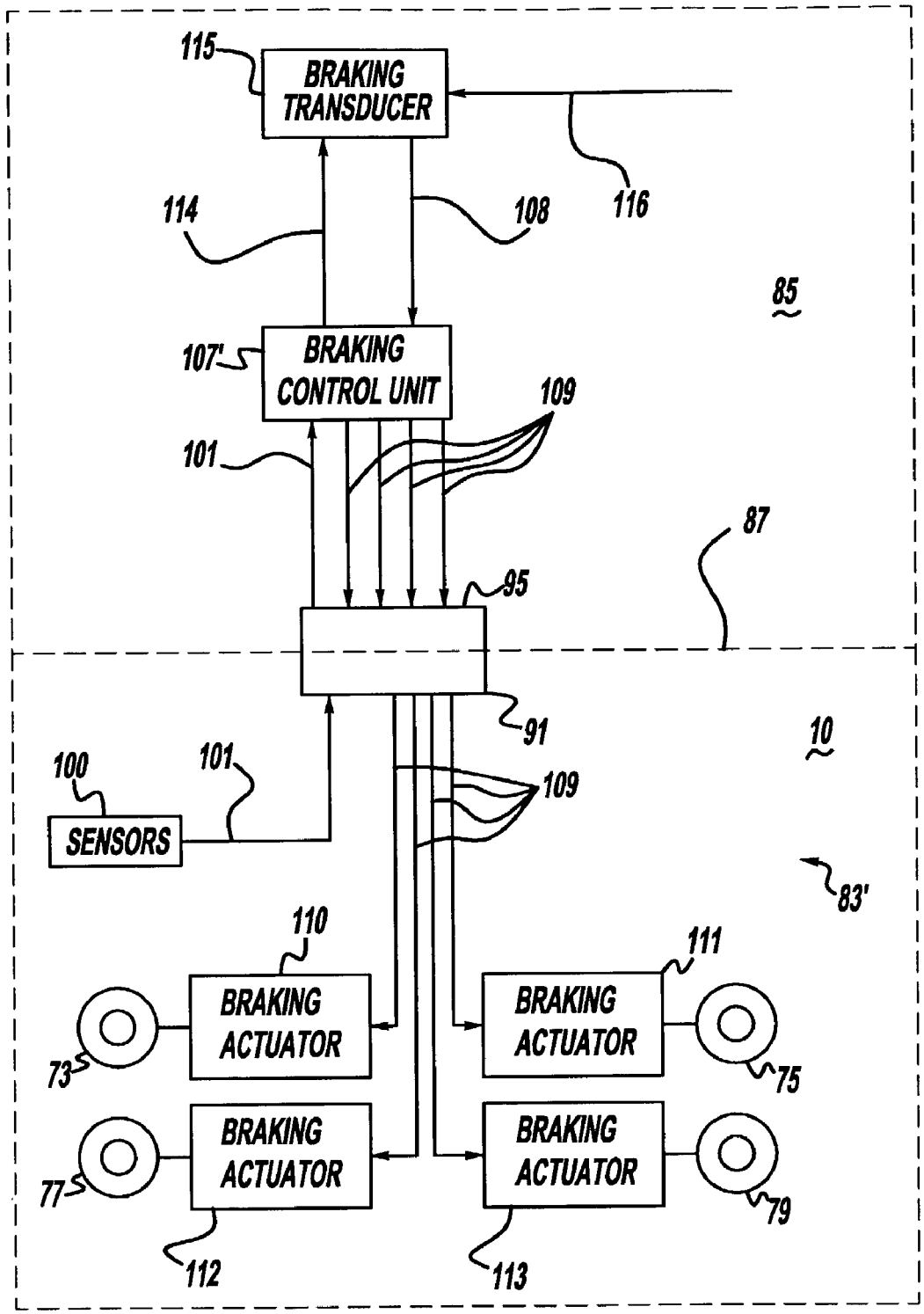
FIG. 9 is a schematic illustration of an alternative braking system for use with the rolling platform and body pod of FIG. 4.

An alternative brake-by-wire system 83' within the scope of the claimed invention is depicted in FIG. 9, wherein like reference numbers refer to like components from FIGS. 6–8. The braking actuators 110, 111, 112, 113 and sensors 100 are connected directly to the electrical connector 91. In this embodiment, a braking control unit 107' may be located in an attached vehicle body 85. A braking transducer 115 transmits electrical braking control signals 108 to the braking control unit 107', and the braking control unit 107' transmits braking actuator signals 109 to the braking actuators 110, 111, 112, 113 via the electrical connector 91.

Examples of brake-by-wire systems are described in U.S. Pat. No. 5,366,281, issued Nov. 22, 2994 to General Motors Corporation; U.S. Pat. No. 5,823,636, issued Oct. 20, 1998 to General Motors Corporation; U.S. Pat. No. 6,305,758, issued Oct. 23, 2001 to Delphi Technologies, Inc.; and U.S. Pat. No. 6,390,565, issued May 21, 2002 to Delphi Technologies, Inc.; which are hereby incorporated by reference in their entireties.

The system described in U.S. Pat. No. 5,366,281 includes an input device for receiving mechanical braking control signals, a brake actuator and a control unit coupled to the input device and the brake actuator. The control unit receives brake commands, or electrical braking control signals, from the input device and provides actuator commands, or braking actuator control signals, to control current and voltage to the brake actuator. When a brake command is first received from the input device, the control unit outputs, for a first predetermined time period, a brake torque command to the brake actuator commanding maximum current to the actuator. After the first predetermined time period, the control unit outputs, for a second predetermined time period, a brake torque command to the brake actuator commanding voltage to the actuator responsive to the brake command and a first gain factor. After the second predetermined time period, the control unit outputs the brake torque command to the brake actuator commanding current to the actuator responsive to the brake command and a second gain factor, wherein the first gain factor is greater than the second gain factor and wherein brake initialization is responsive to the brake input.

U.S. Pat. No. 6,390,565 describes a brake-by-wire system that provides the capability of both travel and force sensors in a braking transducer connected to a brake apply input member such as a brake pedal and also provides redundancy in sensors by providing the signal from a sensor responsive to travel or position of the brake apply input member to a first control unit and the signal from a sensor responsive to force applied to a brake apply input member to a second control unit. The first and second control units are connected by a bi-directional communication link whereby each controller may communicate its received one of the sensor signals to the other control unit. In at least one of the control units, linearized versions of the signals are combined for the generation of first and second brake apply command signals for communication to braking actuators. If either control unit does not receive one of the sensor signals from the other, it nevertheless generates its braking actuator control signal on the basis of the sensor signal provided directly to it. In a preferred embodiment of the system, a control unit combines the linearized signals by choosing the largest in magnitude.

Referring again to FIG. 1, the energy storage system 69 stores energy that is used to propel the chassis 10. For most applications, the stored energy will be in chemical form. Examples of energy storage systems 69 include fuel tanks and electric batteries. In the embodiment shown in FIG. 1, the energy storage system 69 includes two compressed gas cylinder storage tanks 121 (5,000 psi, or 350 bars) mounted within the mid-chassis space 41 and configured to store compressed hydrogen gas. Employing more than two compressed gas cylinder storage tanks may be desirable to provide greater hydrogen storage capacity. Instead of compressed gas cylinder storage tanks 121, an alternate form of hydrogen storage may be employed such as metal or chemical hydrides. Hydrogen generation or reforming may also be used.

The energy conversion system 67 converts the energy stored by the energy storage system 69 to mechanical energy that propels the chassis 10. In the preferred embodiment, depicted in FIG. 1, the energy conversion system 67 includes a fuel cell stack 125 located in the rear axle area 18, and an electric traction motor 127 located in the front axle area 16. The fuel cell stack 125 produces a continuously available power of 94 kilowatts. Fuel cell systems for vehicular use are described in U.S. Pat. No. 6,195,999, issued Mar. 6, 2001 to General Motors Corporation; U.S. Pat. No. 6,223,843, issued May 1, 2001 to General Motors Corporation; U.S. Pat. No. 6,321,145, issued Nov. 20, 2001 to Delphi Technologies, Inc.; and U.S. Pat. No. 6,394,207, issued May 28, 2002 to General Motors Corporation; which are hereby incorporated by reference in their entireties.

The fuel cell stack 125 is operably connected to the compressed gas cylinder storage tanks 121 and to the traction motor 127. The fuel cell stack 125 converts chemical energy in the form of hydrogen from the compressed gas cylinder storage tanks 121 into electrical energy, and the traction motor 127 converts the electrical energy to mechanical energy, and applies the mechanical energy to rotate the front wheels 73, 75. Optionally, the fuel cell stack 125 and traction motor 127 are switched between the front axle area 16 and rear axle area 18. Optionally, the energy conversion system includes an electric battery (not shown) in hybrid combination with the fuel cell to improve chassis acceleration. Other areas provided between the structural elements are useful for housing other mechanisms and systems for providing the functions typical of an automobile as shown in FIGS. 2 and 3. Those skilled in the art will recognize other energy conversion systems 67 that may be employed within the scope of the present invention.

Figure 10:
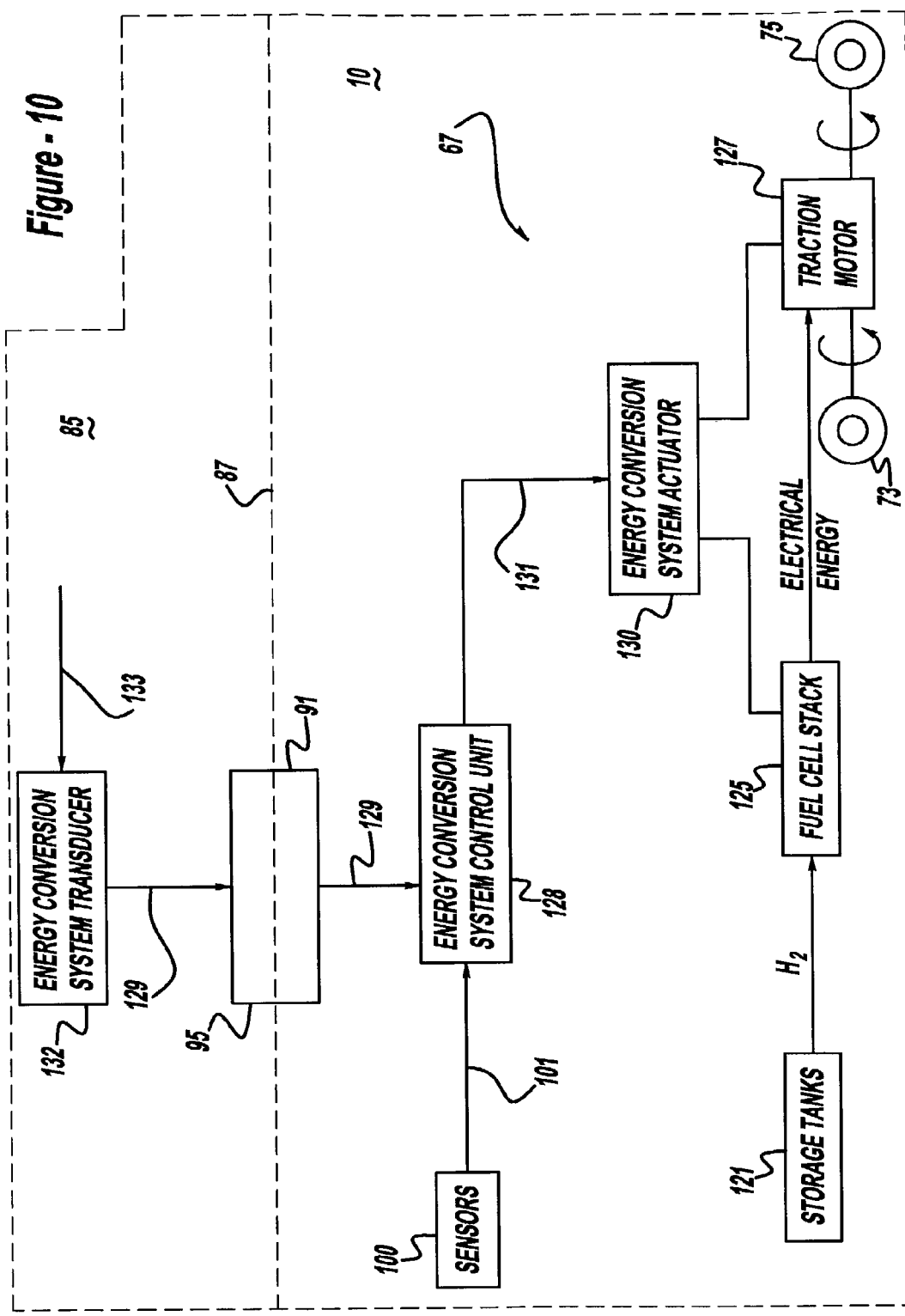
FIG. 10 is a schematic illustration of an energy conversion system for use with the rolling platform and body pod of FIG. 4.

The energy conversion system 67 is configured to respond to non-mechanical control signals. The energy conversion system 67 of the preferred embodiment is controllable by-wire, as depicted in FIG. 10. An energy conversion system control unit 128 is connected to the electrical connector 91 from which it receives electrical energy conversion system control signals 129, and sensors 100 from which it receives sensor signals 101 carrying information about various chassis conditions. In the preferred embodiment, the information conveyed by the sensor signals 101 to the energy conversion system control unit 128 includes chassis velocity, electrical current applied, rate of acceleration of the chassis, and motor shaft speed to ensure smooth launches and controlled acceleration. The energy conversion system control unit 128 is connected to an energy conversion system actuator 130, and transmits energy conversion system actuator control signals 131 to the energy conversion system actuator 130 in response to the electrical energy conversion system control signals 129 and sensor signals 101 according to a stored algorithm. The energy conversion system actuator 130 acts on the fuel cell stack 125 or traction motor 127 to adjust energy output. Those skilled in the art will recognize the various methods by which the energy conversion system actuator 130 may adjust the energy output of the energy conversion system. For example, a solenoid may alternately open and close a valve that regulates hydrogen flow to the fuel cell stack. Similarly, a compressor that supplies oxygen (from air) to the fuel cell stack may function as an actuator, varying the amount of oxygen supplied to the fuel cell stack in response to signals from the energy conversion system control unit.

An energy conversion system transducer 132 may be located on a vehicle body 85 and connected to a complementary electrical connector 95 engaged with the electrical connector 91. The energy conversion system transducer 132 is configured to convert mechanical energy conversion system control signals 133 to electrical energy conversion system control signals 129.

Figure 11:
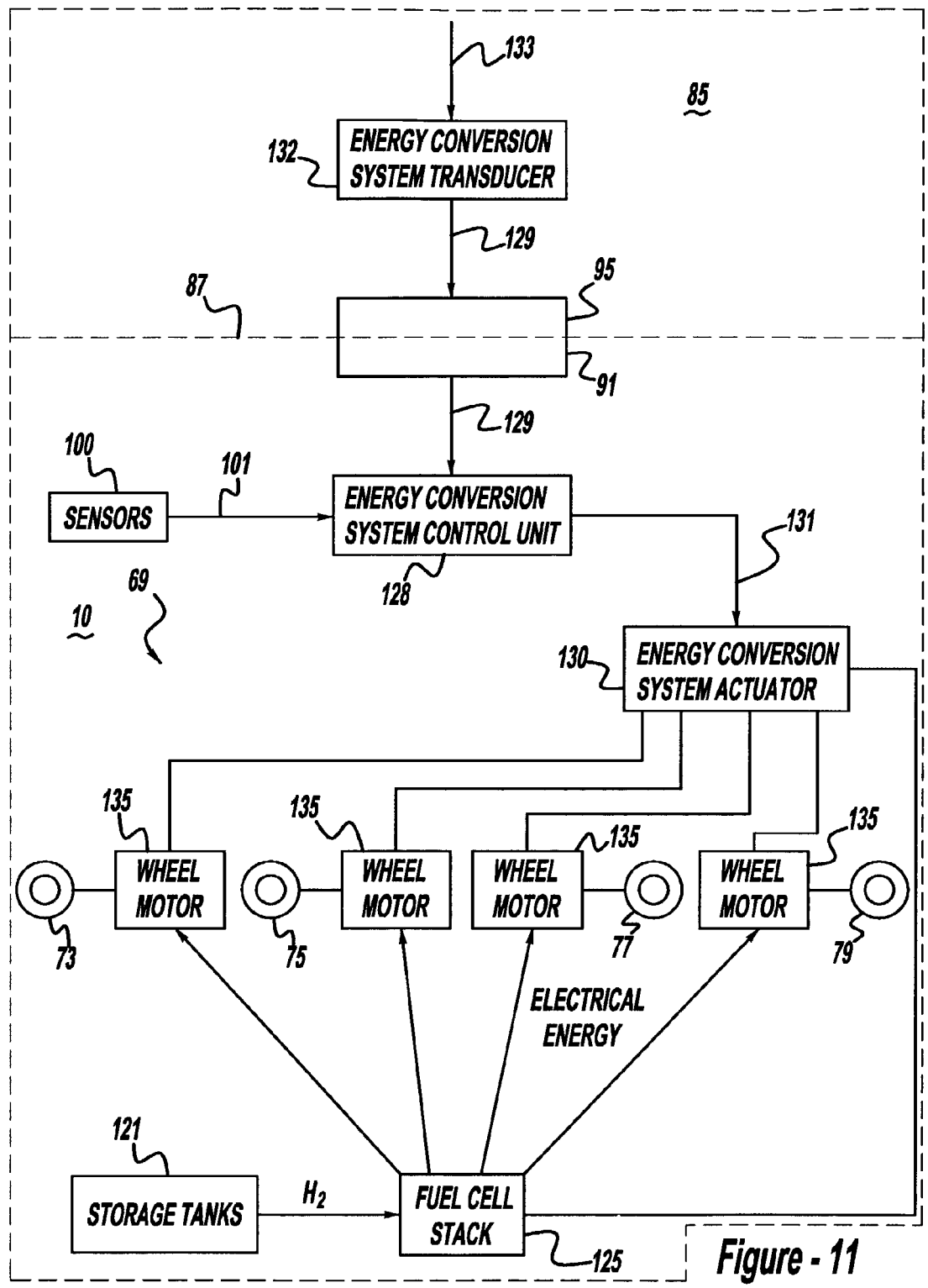
FIG. 11 is a schematic illustration of an alternative energy conversion system for use with the rolling platform and body pod of FIG. 4.

In another embodiment of the invention, as shown schematically in FIG. 11, wherein like reference numbers refer to like components from FIGS. 6–10, wheel motors 135, also known as wheel hub motors, are positioned at each of the four wheels 73, 75, 77, 79. Optionally, wheel motors 135 may be provided at only the front wheels 73, 75 or only the rear wheels 77, 79. The use of wheel motors 135 reduces the height of the chassis 10 compared to the use of traction motors, and therefore may be desirable for certain uses.

Referring again to FIG. 2, a conventional heat exchanger 137 and electric fan system 139, operably connected to the fuel cell stack 125 to circulate coolant for waste heat rejection, is carried in an opening that exists between the rear axle area 18 and the structural elements 54, 60. The heat exchanger 137 is set at an inclined angle to reduce its vertical profile, but to provide adequate heat rejection it also extends slightly above the top of elements 12, 26 (as seen in FIG. 4). Although the fuel cell stack 125, heat exchanger 137 and electric fan system 139 extend above the structural elements, their protrusion into the body pod space is relatively minor when compared to the engine compartment requirements of a conventionally designed automobile, especially when the chassis height of the preferred embodiment is approximately a mere 15 inches (28 centimeters). Optionally, the heat exchanger 137 is packaged completely within the chassis' structure with airflow routed through channels (not shown).

Referring again to FIG. 1, the suspension system 71 is mounted to the structural frame 11 and is connected to four wheels 73, 75, 77, 79. Those skilled in the art will understand the operation of a suspension system, and recognize that a multitude of suspension system types may be used within the scope of the claimed invention. The suspension system 71 of the preferred embodiment of the invention is electronically controlled, as depicted schematically in FIG. 12.

Figure 12:
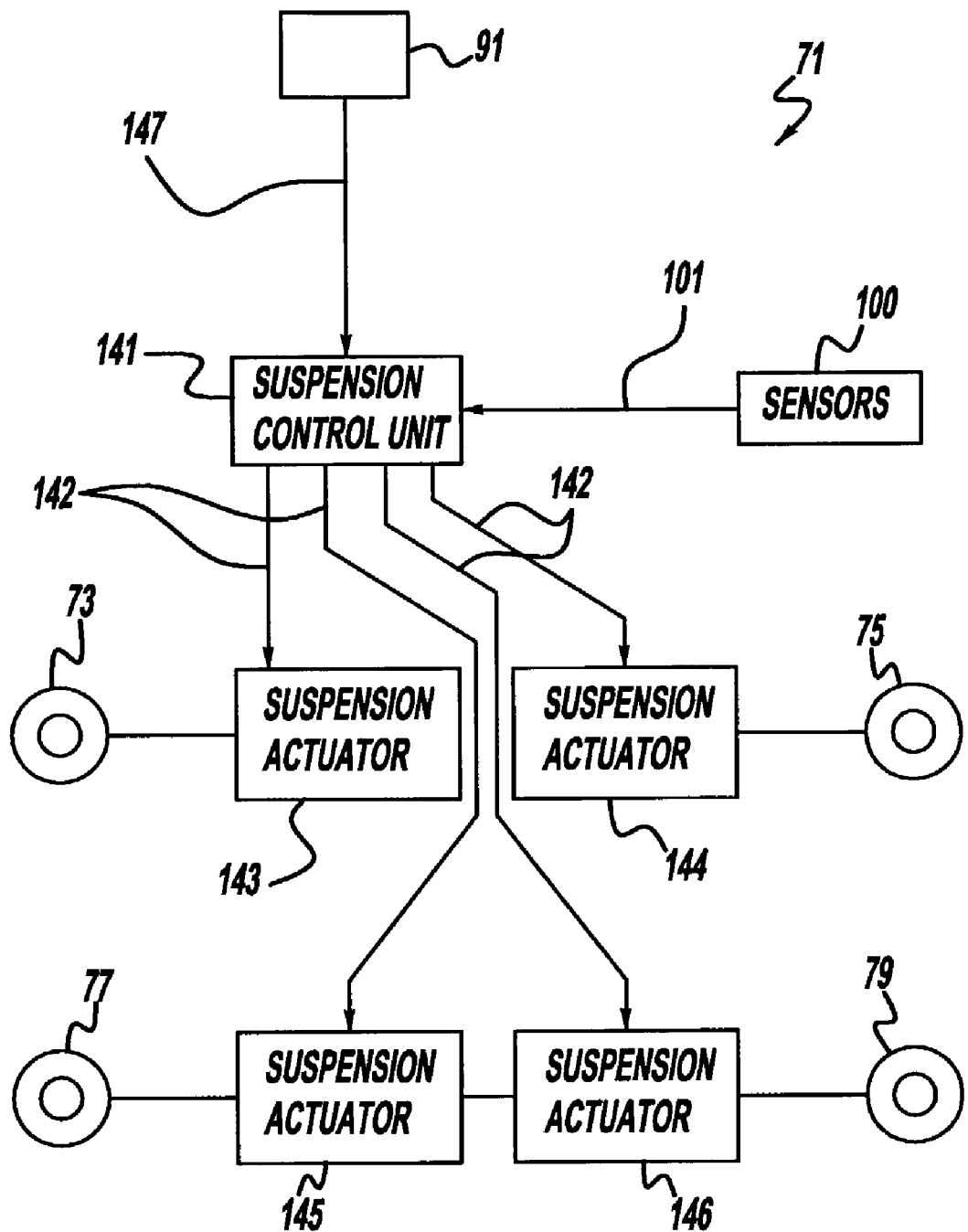
FIG. 12 is a schematic illustration of a suspension system for use with the rolling platform of FIGS. 1–5.

Referring to FIG. 12, the behavior of the electronically controlled suspension system 71 in response to any given road input is determined by a suspension control unit 141. Sensors 100 located on the chassis 10 monitor various conditions such as vehicle speed, angular wheel velocity, and wheel position relative to the chassis 10. The sensors 100 transmit the sensor signals 101 to the suspension control unit 141. The suspension control unit 141 processes the sensor signals 101 and generates suspension actuator control signals 142 according to a stored algorithm. The suspension control unit 141 transmits the suspension actuator control signals 142 to four suspension actuators 143, 144, 145, 146. Each suspension actuator 143, 144, 145, 146 is operably connected to a wheel 73, 75, 77, 79 and determines, in whole or in part, the position of the wheel 73, 75, 77, 79 relative to the chassis 10. The suspension actuators of the preferred embodiment are variable-force, real time, controllable dampers. The suspension system 71 of the preferred embodiment is also configured such that chassis ride height is adjustable. Separate actuators may be used to vary the chassis ride height.

In the preferred embodiment, the suspension control unit 141 is programmable and connected to the electrical connector 91 of the body-attachment interface 87. A vehicle user is thus able to alter suspension system 71 characteristics by reprogramming the suspension control unit 141 with suspension system software 147 via the electrical connector 91.

Figure 13:
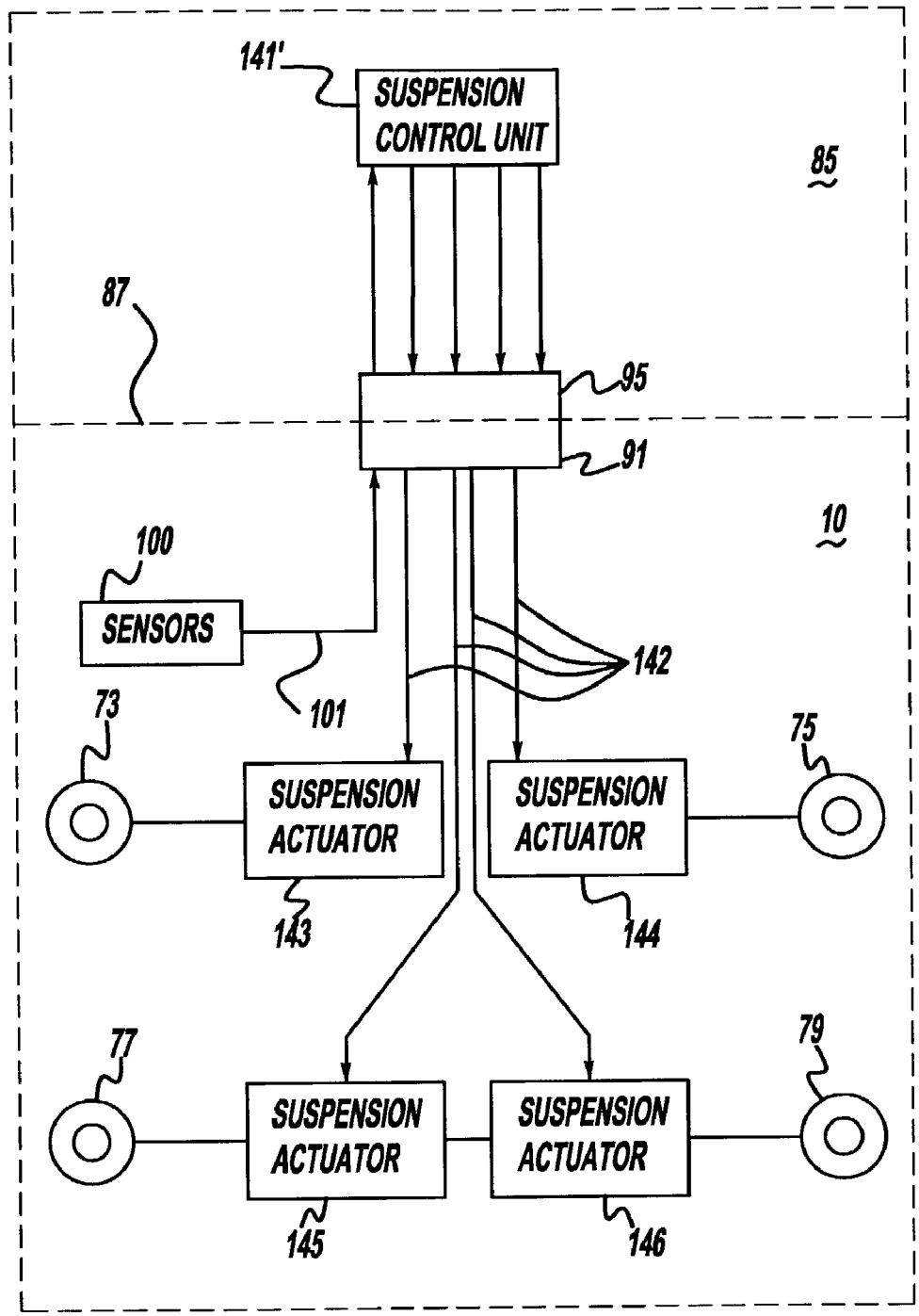
FIG. 13 is a schematic illustration of an alternative suspension system for use with the rolling platform and body pod of FIG. 4.

In the context of the claimed invention, electronically-controlled suspension systems include suspension systems without a suspension control unit located on the chassis 10. Referring to FIG. 13, wherein like reference numbers are used to reference like components from FIG. 12, suspension actuators 143, 144, 145, 146 and suspension sensors 100 are connected directly to the electrical connector 91. In such an embodiment, a suspension control unit 141' located on an attached vehicle body 85 can process sensor signals 101 transmitted through the electrical connector 91, and transmit suspension actuator control signals 142 to the suspension actuators 143, 144, 145, 146 via the electrical connector 91.

Examples of electronically controlled suspension systems are described in U.S. Pat. No. 5,606,503, issued Feb. 25, 1997 to General Motors Corporation; U.S. Pat. No. 5,609,353, issued Mar. 11, 1997 to Ford Motor Company; and U.S. Pat. No. 6,397,134, issued May 28, 2002 to Delphi Technologies, Inc.; which are hereby incorporated by reference in their entireties.

U.S. Pat. No. 6,397,134 describes an electronically controlled suspension system that provides improved suspension control through steering crossover events. In particular, the system senses a vehicle lateral acceleration and a vehicle steering angle and stores, for each direction of sensed vehicle lateral acceleration, first and second sets of enhanced suspension actuator control signals for the suspension actuators of the vehicle. Responsive to the sensed vehicle lateral acceleration and sensed vehicle steering angle, the system applies the first set of enhanced actuator control signals to the suspension actuators if the sensed steering angle is in the same direction as the sensed lateral acceleration and alternatively applies the second set of enhanced actuator control signals to the suspension actuators if the sensed steering angle is in the opposite direction as the sensed lateral acceleration.

U.S. Pat. No. 5,606,503 describes a suspension control system for use in a vehicle including a suspended vehicle body, four un-suspended vehicle wheels, four variable force actuators mounted between the vehicle body and wheels, one of the variable force actuators at each corner of the vehicle, and a set of sensors providing sensor signals indicative of motion of the vehicle body, motion of the vehicle wheels, a vehicle speed and an ambient temperature. The suspension control system comprises a microcomputer control unit including: means for receiving the sensor signals; means, responsive to the sensor signals, for determining an actuator demand force for each actuator; means, responsive to the vehicle speed, for determining a first signal indicative of a first command maximum; means, responsive to the ambient temperature, for determining a second signal indicative of a second command maximum; and means for constraining the actuator demand force so that it is no greater than a lesser of the first and second command maximums.

Electrically conductive wires (not shown) are used in the preferred embodiment to transfer signals between the chassis 10 and an attached body 85, and between transducers, control units, and actuators. Those skilled in the art will recognize that other non-mechanical means of sending and receiving signals between a body and a chassis, and between transducers, control units, and actuators may be employed and fall within the scope of the claimed invention. Other non-mechanical means of sending and receiving signals include radio waves and fiber optics.

The by-wire systems are networked in the preferred embodiment, in part to reduce the quantity of dedicated wires connected to the electrical connector 91. A serial communication network is described in U.S. Pat. No. 5,534,848, issued Jul. 9, 1996 to General Motors Corporation, which is hereby incorporated by reference in its entirety. An example of a networked drive-by-wire system is described in U.S. Patent Application Publication No. US 2001/0029408, Ser. No. 09/775,143, which is hereby incorporated by reference in its entirety. Those skilled in the art will recognize various networking devices and protocols that may be used within the scope of the claimed invention, such as SAE J1850 and CAN ("Controller Area Network"). A TTP ("Time Triggered Protocol") network is employed in the preferred embodiment of the invention for communications management.

Figure 14:
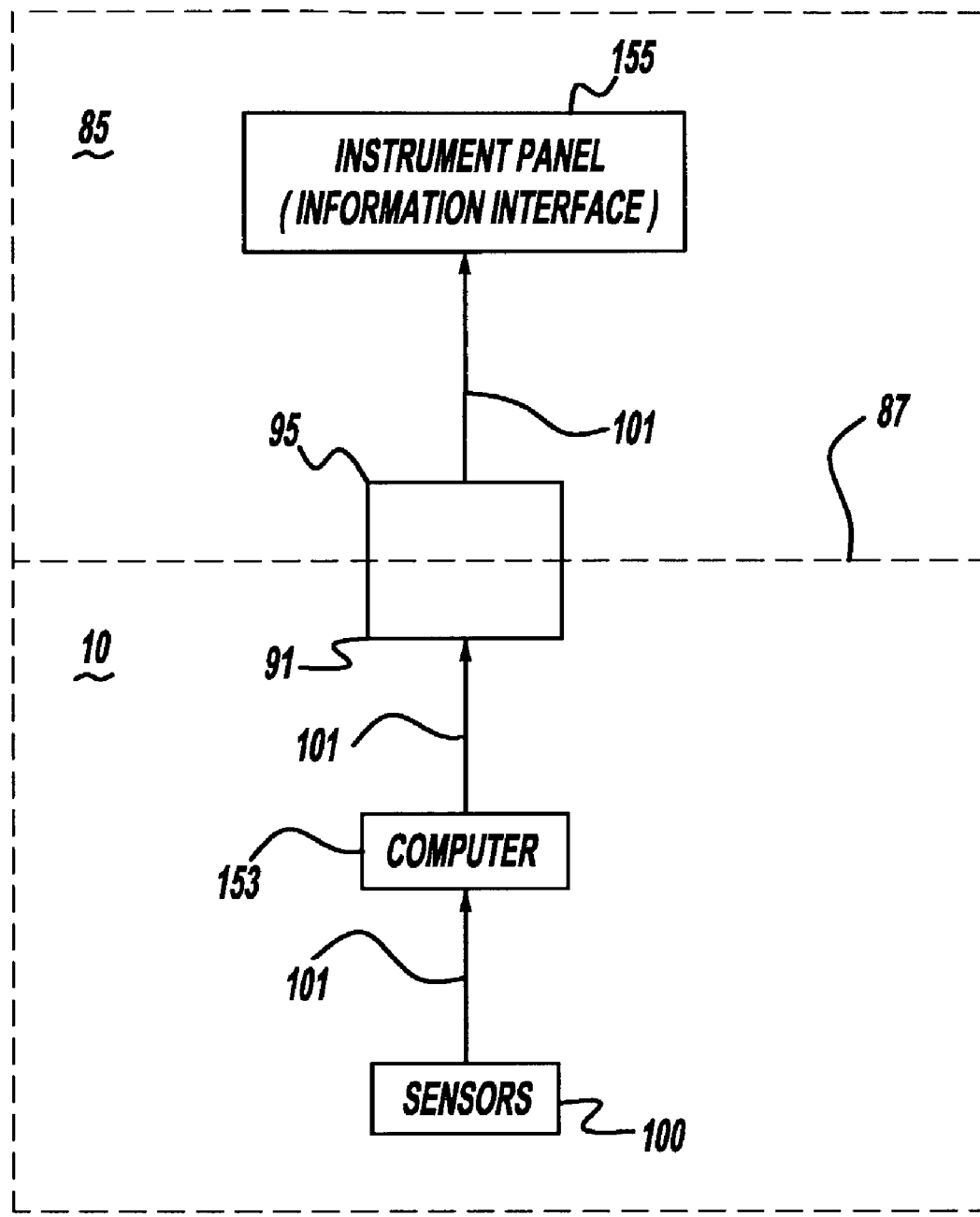
FIG. 14 is a schematic illustration of a chassis computer and chassis sensors for use with the rolling platform and body pod of FIG. 4.

Some of the information collected by the sensors 100, such as chassis velocity, fuel level, and system temperature and pressure, is useful to a vehicle driver for operating the chassis and detecting system malfunctions. As shown in FIG. 14, the sensors 100 are connected to the electrical connector 91 through a chassis computer 153. Sensor signals 101 carrying information are transmitted from the sensors 100 to the chassis computer 153, which processes the sensor signals 101 according to a stored algorithm. The chassis computer 153 transmits the sensor signals 101 to the electrical connector 91 when, according to the stored algorithm, the sensor information is useful to the vehicle driver. For example, a sensor signal 101 carrying temperature information is transmitted to the electrical connector 91 by the chassis computer 153 when the operating temperature of the chassis 10 is unacceptably high. A driver-readable information interface 155 may be attached to a complementary electrical connector 95 coupled with the electrical connector 91 and display the information contained in the sensor signals 101. Driver-readable information interfaces include, but are not limited to, gauges, meters, LED displays, and LCD displays. The chassis may also contain communications systems, such as antennas and telematics systems, that are operably connected to an electrical connector in the body-attachment interface and configured to transmit information to an attached vehicle body.

Figure 15:
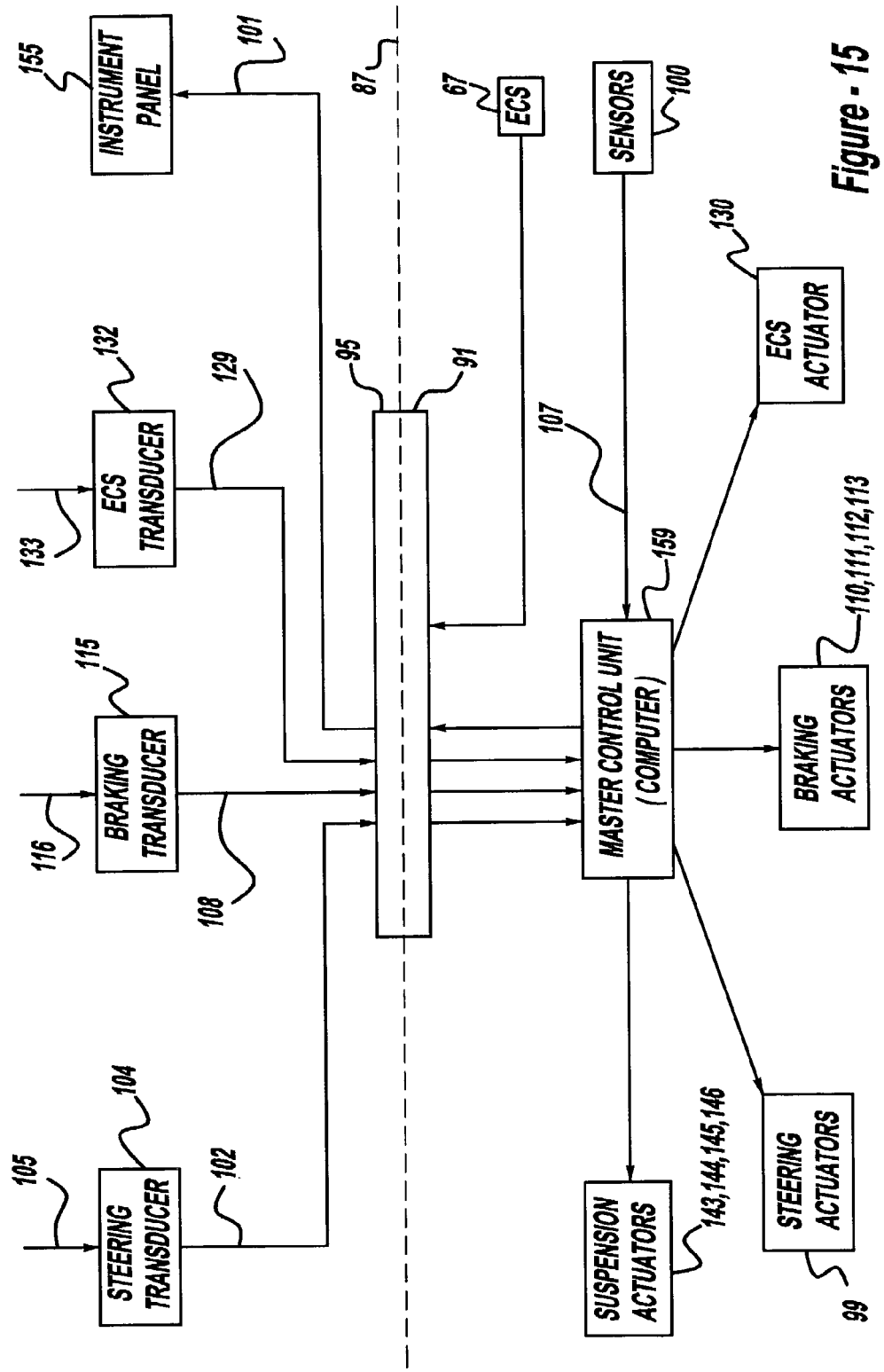
FIG. 15 is a schematic illustration of a master control unit with a suspension system, braking system, steering system, and energy conversion system for use with the rolling platform and body pod of FIG. 4.

One control unit may serve multiple functions. For example, as shown in FIG. 15, a master control unit 159 functions as the steering control unit, braking control unit, suspension control unit, and energy conversion system control unit.

Referring again to FIG. 15, the energy conversion system 67 is configured to transmit electrical energy to the electrical connector 91 to provide electric power for systems located on an attached vehicle body, such as power windows, power locks, entertainment systems, heating, ventilating, and air conditioning systems, etc. Optionally, if the energy storage system 69 includes a battery, then the battery may be connected to the electrical connector 91. In the preferred embodiment, the energy conversion system 67 includes a fuel cell stack that generates electrical energy and is connected to the electrical connector 91.

Figure 16:
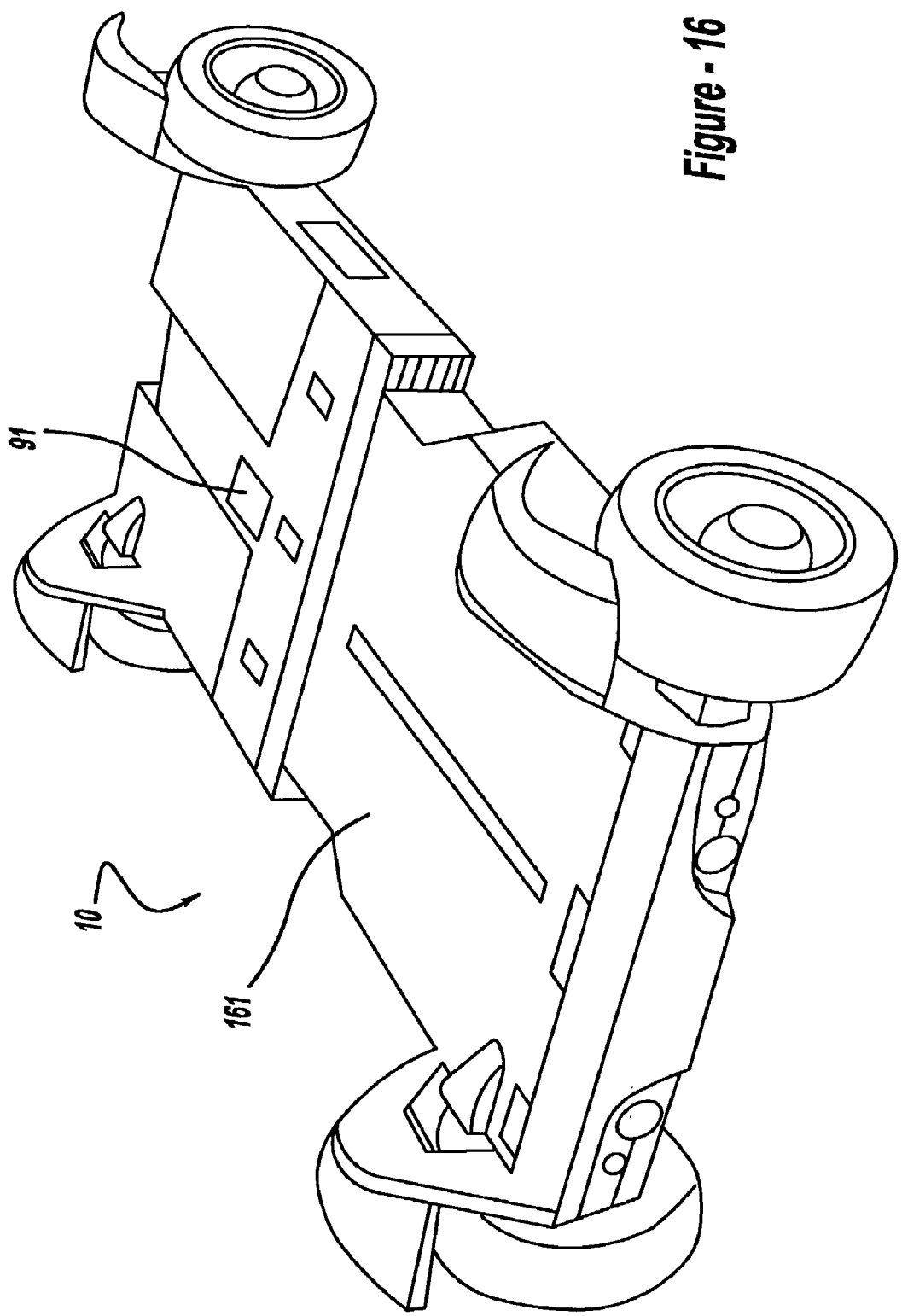
FIG. 16 is a perspective illustration of a skinned rolling platform according to a further embodiment of the present invention.
Figure 17:
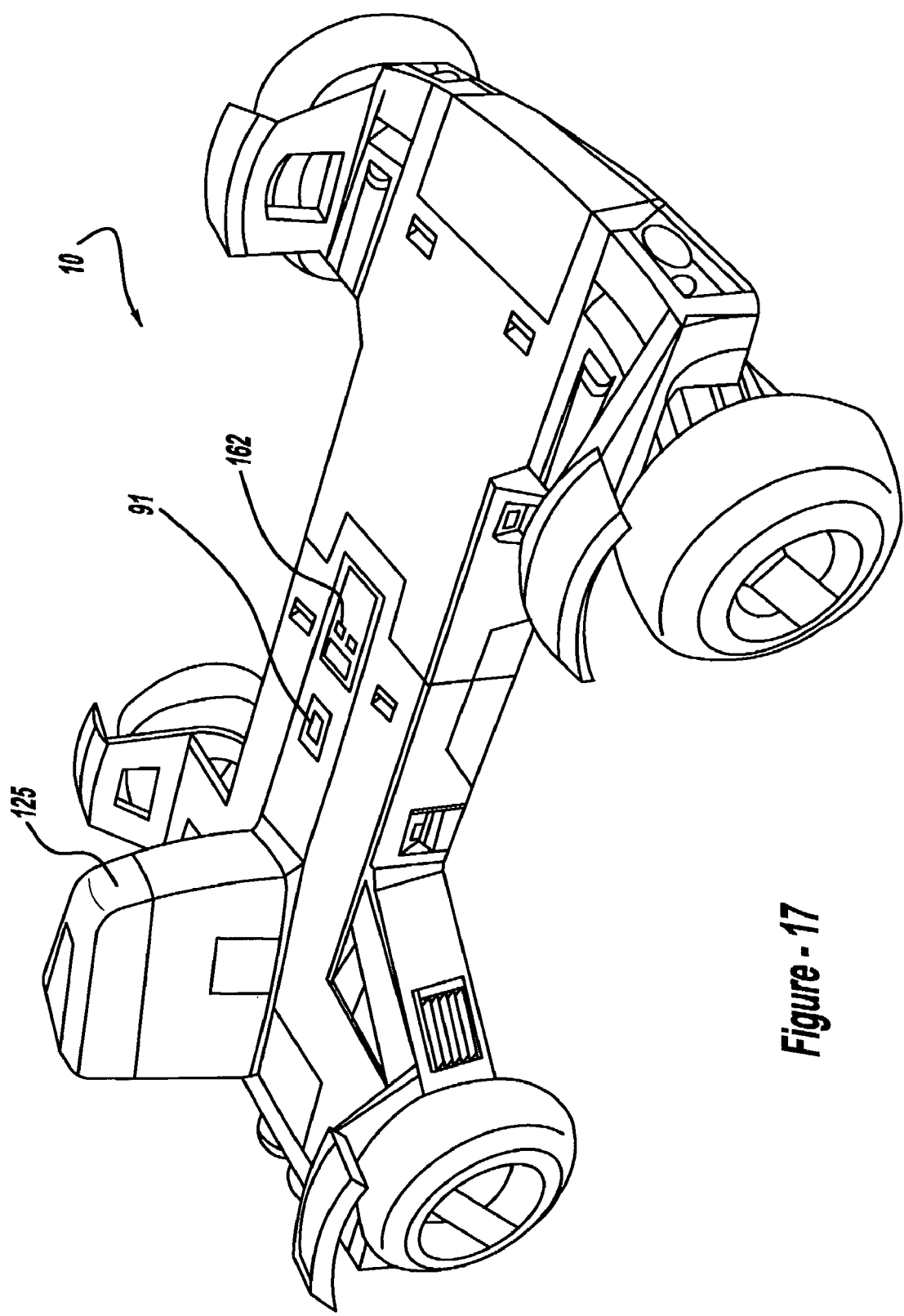
FIG. 17 is a perspective illustration of a skinned rolling platform according to another embodiment of the present invention.

FIG. 16 shows a chassis 10 with rigid covering, or "skin," 161 and an electrical connector or coupling 91 that functions as an umbilical port. The rigid covering 161 may be configured to function as a vehicle floor, which is useful if an attached vehicle body 85 does not have a lower surface. In FIG. 17 a similarly equipped chassis 10 is shown with an optional vertical fuel cell stack 125. The vertical fuel cell stack 125 protrudes significantly into the body pod space which is acceptable for some applications. The chassis 10 also includes a manual parking brake interface 162 that may be necessary for certain applications and therefore is also optionally used with other embodiments.

Figure 18:
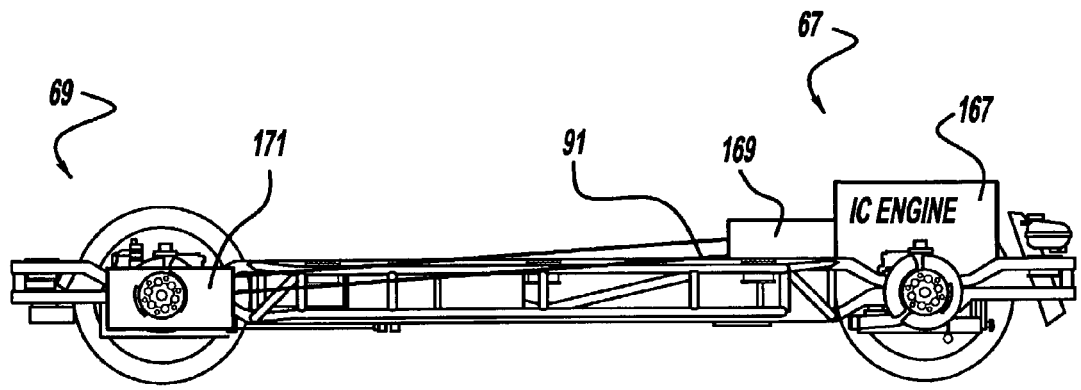
FIG. 18 is a side schematic illustration of a rolling platform with an energy conversion system including an internal combustion engine, and gasoline tanks.

FIG. 18 depicts an embodiment of the invention that may be advantageous in some circumstances. The energy conversion system 67 includes an internal combustion engine 167 with horizontally-opposed cylinders, and a transmission 169. The energy storage system 69 includes a gasoline tank 171.

Figure 19:
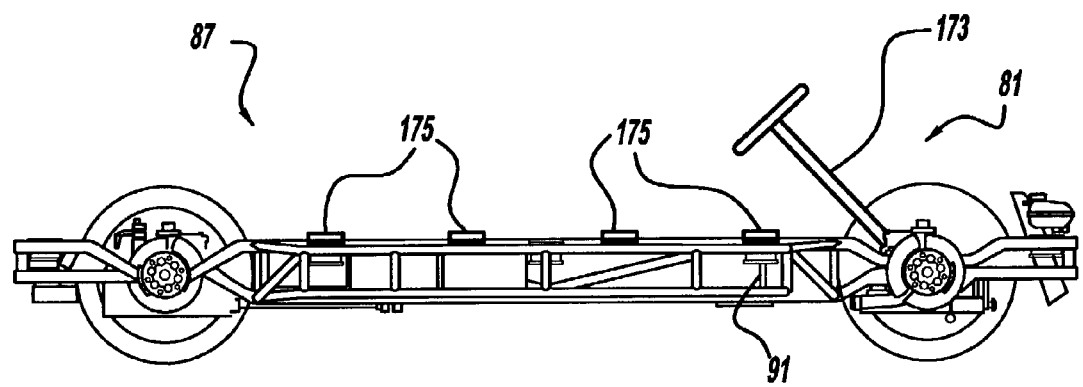
FIG. 19 is a side schematic illustration of a rolling platform according to another embodiment of the invention, with a mechanical steering linkage and passenger seating attachment couplings.

FIG. 19 depicts an embodiment of the invention wherein the steering system 81 has mechanical control linkages including a steering column 173. Passenger seating attachment couplings 175 are present on the body attachment interface 87, allowing the attachment of passenger seating assemblies to the chassis 10.

Figures 20, 20A:
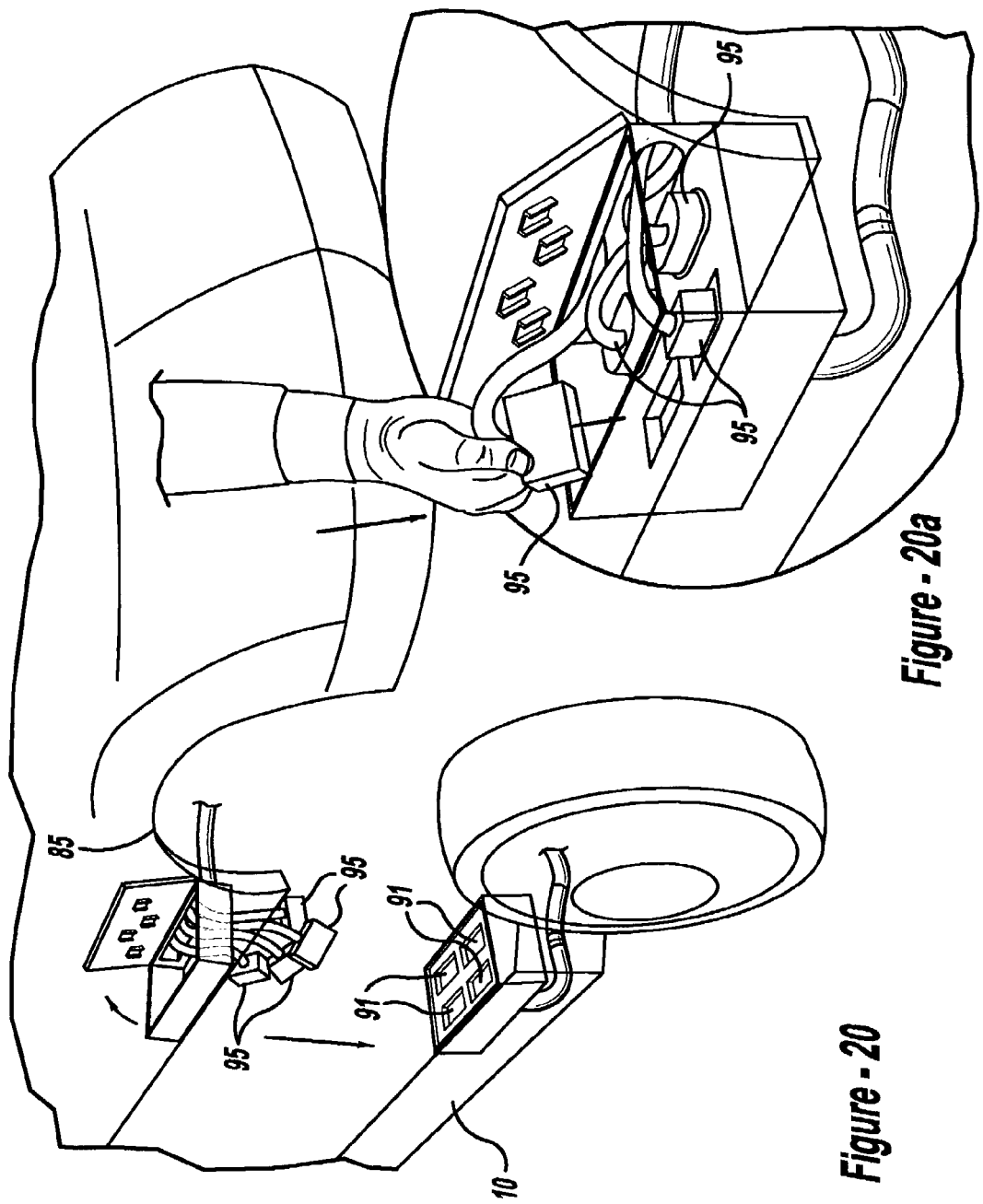
FIGS. 20 and 20a show partial exploded perspective schematic illustrations of a rolling platform according to a further embodiment of the invention in an attachment scenario with a body pod, the rolling platform having multiple electrical connectors engageable with complementary electrical connectors in the body pod.

FIGS. 20 and 20a depict a chassis 10 within the scope of the invention and a body 85 each having multiple electrical connectors 91 and multiple complementary electrical connectors 95, respectively. For example, a first electrical connector 91 may be operably connected to the steering system and function as a control signal receiver. A second electrical connector 91 may be operably connected to the braking system and function as a control signal receiver. A third electrical connector 91 may be operably connected to the energy conversion system and function as a control signal receiver. A fourth electrical connector 91 may be operably connected to the energy conversion system and function as an electrical power connector. Four multiple wire in-line connectors and complementary connectors are used in the embodiment shown in FIGS. 20 and 20a. FIG. 20a depicts an assembly process for attaching corresponding connectors 91, 95.

Figure 21:
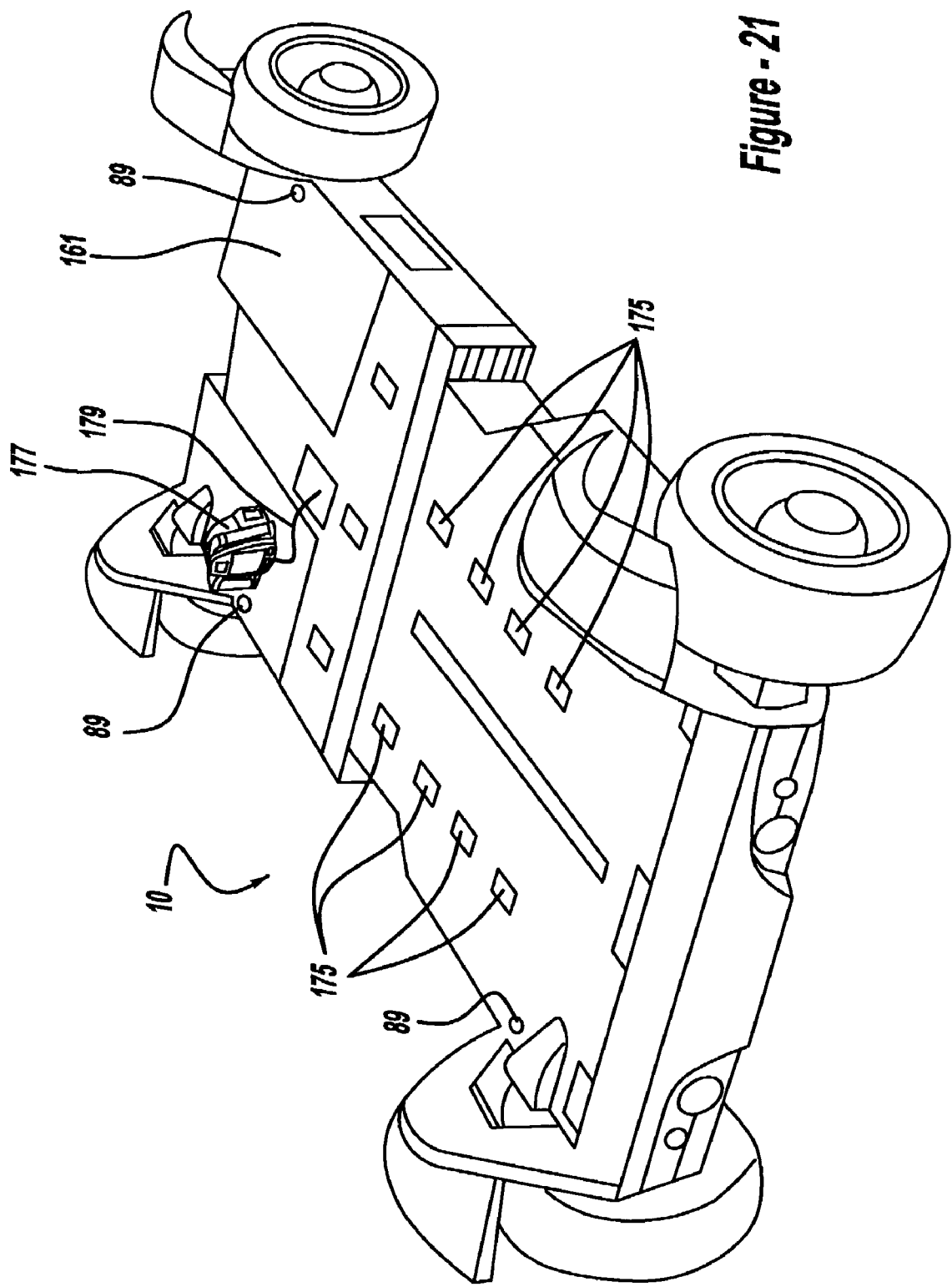
FIG. 21 is a perspective schematic illustration of a skinned rolling platform according to yet another embodiment of the invention, the rolling platform having a movable control input device.

Referring to FIG. 21, a further embodiment of the claimed invention is depicted. The chassis 10 has a rigid covering 161 and a plurality of passenger seating attachment couplings 175. A driver-operable control input device 177 containing a steering transducer, a braking transducer, and an energy conversion system transducer, is operably connected to the steering system, braking system, and energy conversion system by wires 179 and movable to different attachment points.

The embodiment depicted in FIG. 21 enables bodies of varying designs and configurations to mate with a common chassis design. A vehicle body without a lower surface but having complementary attachment couplings is matable to the chassis 10 at the load-bearing body retention couplings 89. Passenger seating assemblies may be attached at passenger seating attachment couplings 175.

Figure 22:
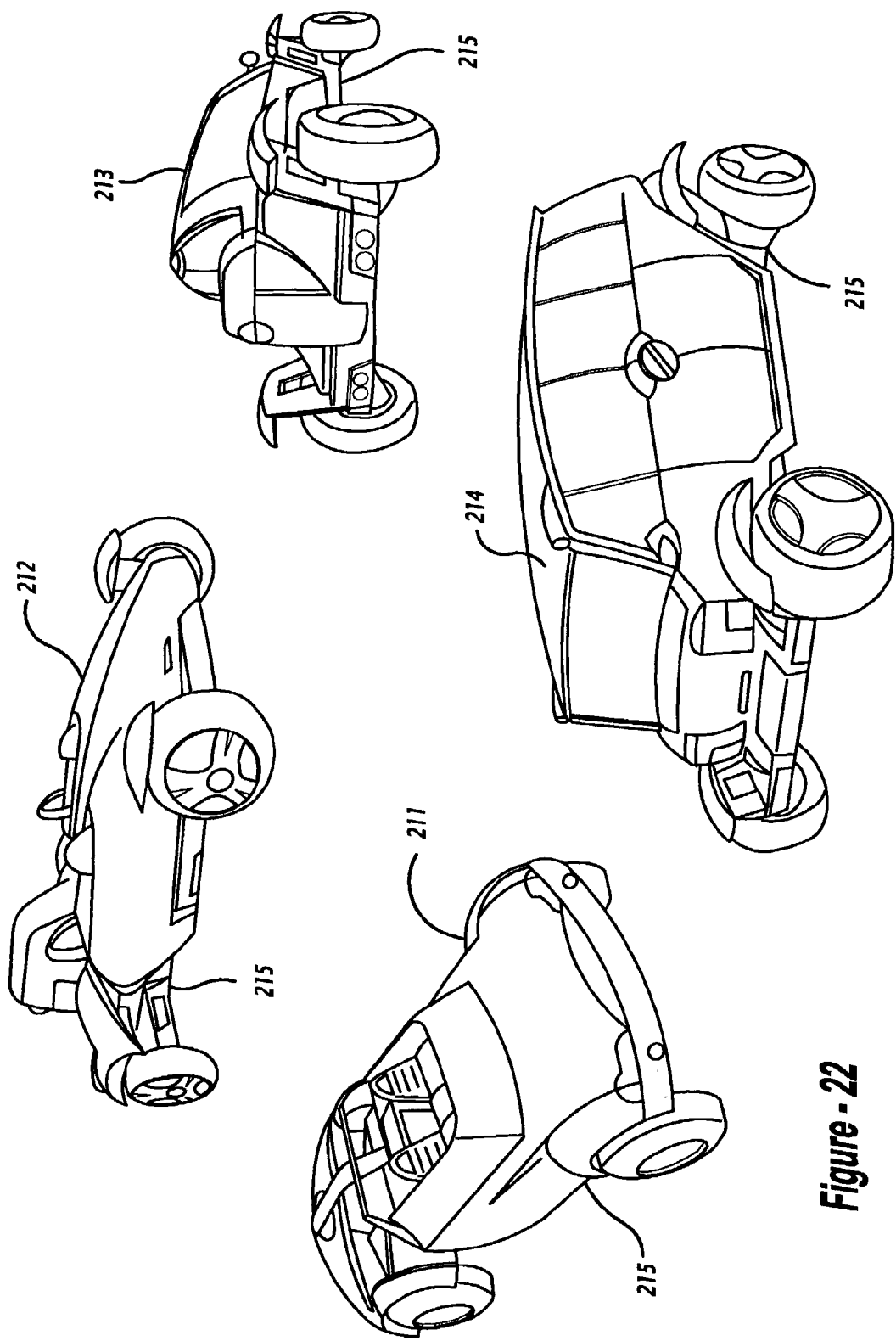
FIG. 22 is an illustration of a body selection grouping showing perspective views of vehicles according to various aspects of the present invention.

FIG. 22 illustrates a range of bodies or body pods 211–214 that may be employed on a single chassis or rolling platform 215. The owner of the rolling platform 215 can adapt to seasonal changes or lifestyle changes by simply changing vehicle body pods. The rolling platform comprises most of the durable hardware, meaning body pods require far less material and energy to produce than complete vehicles.

Figure 23:
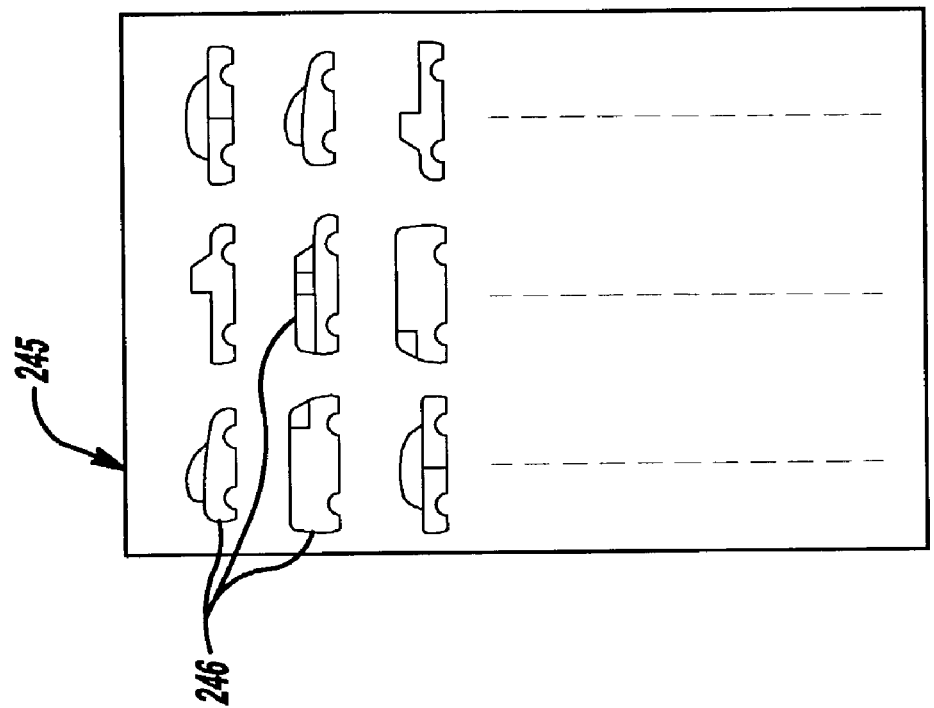
FIG. 23 is a process diagram illustrating a body inventory and a chassis with a removable body in accordance with the invention.
Figure 23:
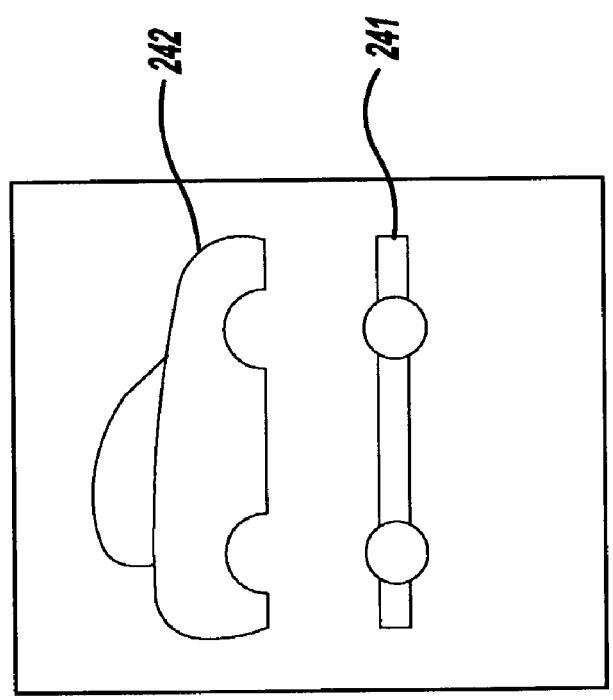

Referring to FIG. 23, the process of securing optional bodies or body pods is depicted. Body pods can be hot swapped on a random time interval basis according to the whim of the driver or on a scheduled basis according to the guidelines of the vehicle pod provider. This aspect provides a business model of how a vehicle body can be rented, leased, exchanged, or sold. The process of vehicle body interchangeability provides that the consumer can disconnect and connect vehicle bodies quickly without headaches of complexity. Just lift off and drop pods with mechanical and electrical common interface connections as described previously. Initially, the driver secures the use of a rolling chassis 241 and a body pod 242. A body pod service provider 245 maintains an inventory of body pods 246 that are either available on site, ordered to specification, or in use by other drivers and rotated among a group of drivers according to schedule. Each body pod carries a chip that may communicate parameters to the rolling chassis to set fuel cell performance or engine performance to match the body pod, adjusts suspension performance, adjusts steering performance and communicates other specifications.

Figure 24:
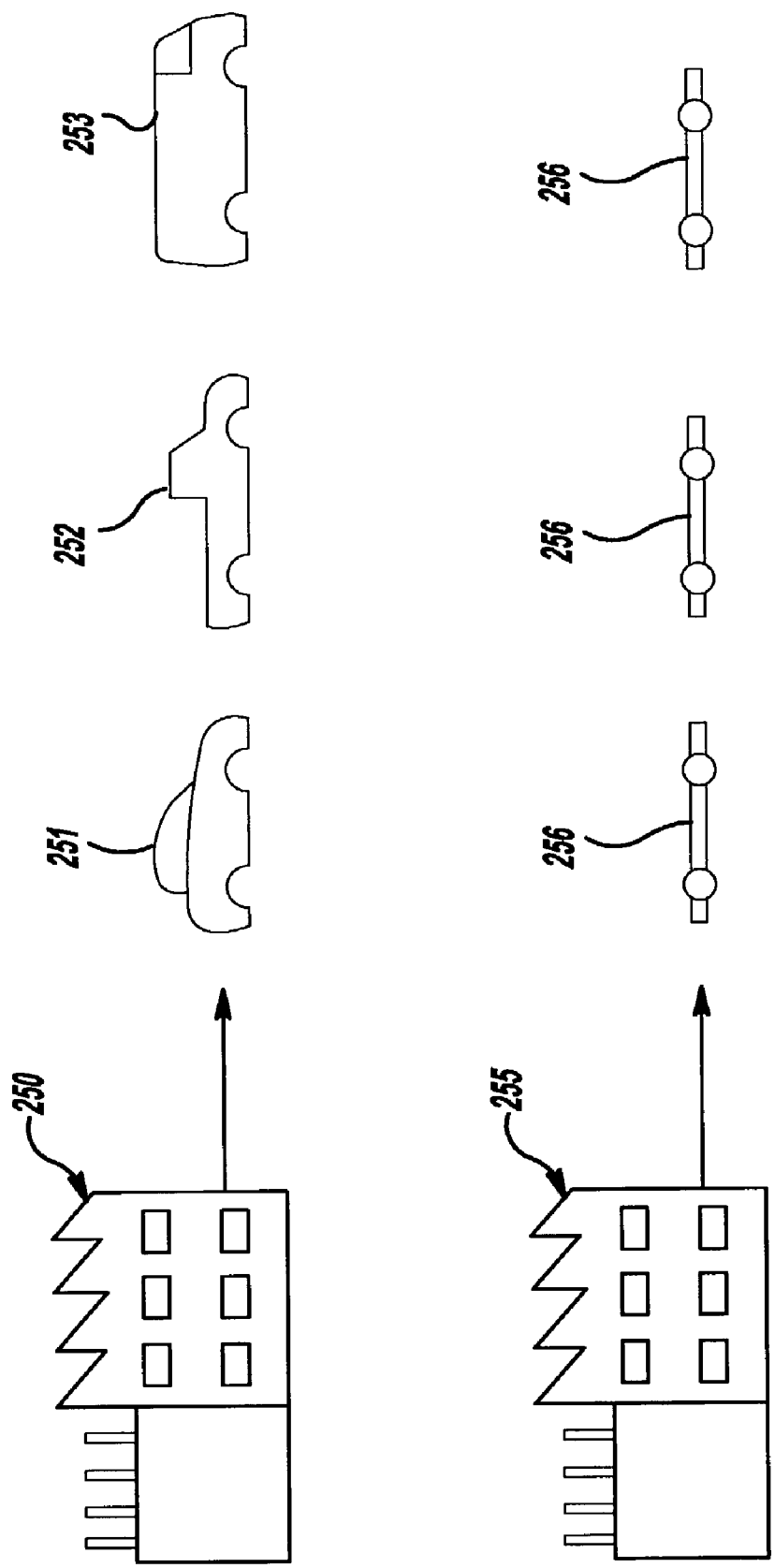
FIG. 24 is a process diagram illustrating body and chassis manufacturing operations.

The manufacture of chassis or rolling platforms and body pods is depicted in FIG. 24. In the conventional manufacturing processes, the automobile is manufactured as a single unitary system. According to the present invention, the rolling platform system is manufactured independently of the vehicle body pods. The rolling platform, which contains a majority of the technological and mechanical content, is exported from central manufacturing locations to any location around the world. The vehicle bodies are manufactured in the same central locations or in local environments incorporating local materials and matched to the needs of the local market.

Engineering of the rolling platform enables the vehicle body to be designed and produced independently. Bodies are manufactured and designed substantially independently anywhere in the world to meet different consumer desires. Local manufacturers, using locally available materials, can build vehicle bodies according to local tastes. Without a coupled body, the rolling platform manufacturing process is streamlined for production at key manufacturing sites around the world for exportation to points of purchase. Designers have the ability to redesign vehicle bodies without reengineering the entire vehicle.

According to the embodiment shown in FIG. 24, a factory 250 manufactures body pods according to a plurality of designs 251–253. The body pods are complete, or essentially complete, ready to be interconnected with a rolling chassis. All body pod styles 251–253 are designed to be connected to a rolling chassis having common connection points. A second factory 255 which can be located remote from the factory 250, or can be the same factory, produces rolling chassis 256. The rolling chassis 256 each have common connection points for connecting to a plurality of body pods.

Figure 25:
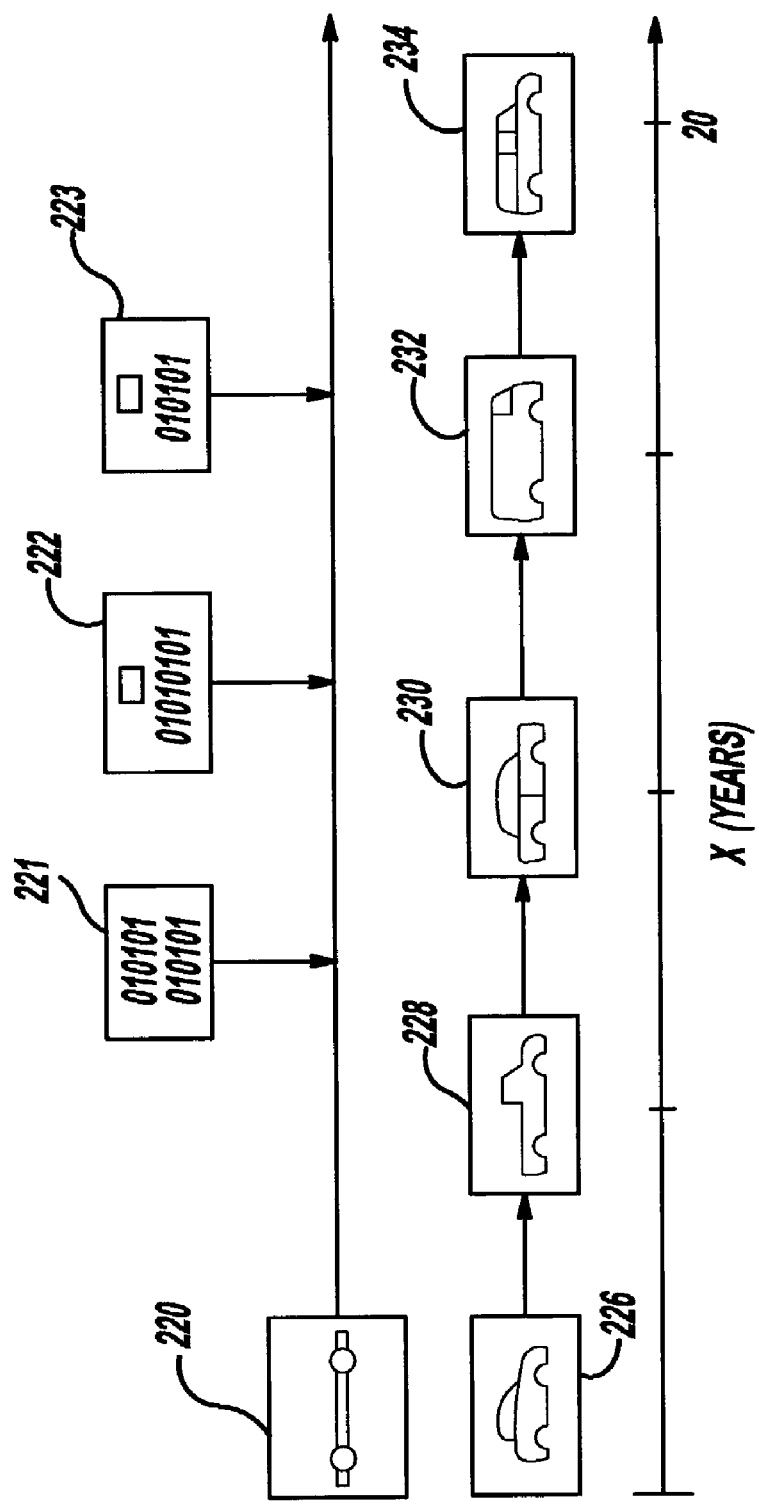
FIG. 25 is a flow chart illustrating interchangeability of vehicle bodies with a single chassis over an extended period of time, and including software and hardware upgrades.

Turning to FIG. 25, a business process model is illustrated wherein an owner secures a rolling chassis 220 for x years by means such as a purchase, with or without financing, or under a lease. The rolling chassis may be mortgaged for 20 years, for example, wherein the expense is spread out over the expected reasonable serviceability life of the unit. The terms of the transaction include certain software upgrades 221 and hardware/software upgrades 222 that are provided without additional charge and other upgrades 223 that are secured by the owner/lessee (driver) at their option and at additional cost. At the end of the 20 year span (or other term), the rolling chassis may be owned with no security obligation remaining to the original financing entity.

During the life of the rolling chassis, the vehicle is used according to their changing tastes or needs. For example, a scenario wherein a driver starts with a small, sporty body pod 226, advances to a utilitarian type body pod 228, then to a sport-utility type body pod 230, a van type body pod 232 and onto a station wagon type body pod 234 is possible. Of course, the type of body pods chosen and the time to change is completely discretionary.

The invention also provides an accelerated vehicle development process wherein a vehicle body is designed, developed and engineered for a faster market response time by conducting the process separately from the validation of the rolling platform (chassis) and its mechanical and electrical system hardware. The faster vehicle body validation is achieved because the rolling platform (chassis) is a separate product which is validated separately, and the body may be validated independently of the rolling platform for various requirements related to form, fit and function. For example, the chassis and body may be independently validated for driveability, electrical system robustness, suspension performance, wheel tuning, ride and handling, squeak and rattle; noise and vibration, etc.

By starting with a common interface system for mating chassis to a variety of different types of bodies, such as the interface 87 described previously with respect to FIGS. 1–15, separate body and chassis design teams may work independently and in parallel (concurrently) to design, build and validate bodies and chassis in an accelerated vehicle development process. In fact, using the common interface system, unrelated business entities may separately design and develop different bodies or chassis conforming with the standardized interface.

Designers can invent and create vehicle bodies with minimal packaging limitations imposed by the chassis design. Interior variation in the body is enabled with the reduction of mechanical and electrical system hardware packaging content in the body. Off-the-shelf validated hardware, like seats, may be used to pick and place within a body design. This enables faster time to market by eliminating vehicle content and reducing validation time for quicker vehicle body model changes and enhancements.

Similarly, designers may more quickly create new and different chassis independently of the bodies and in compliance with the standardized interface system. Also, a single chassis design, or a family of chassis designs, may be configured to receive differently sized bodies. For example, a chassis may have 11 body connection components, wherein all 11 connection components are used to attach a large body, 9 connection components are used to attach a mid-sized body, and 7 connection components are used to attach a small body.

There are several benefits to the accelerated vehicle development process. Faster time to market is achieved by the utilization of new technologies and material processes that can reduce the long lead times for tooling. Vehicle brand differentiation may be achieved more readily through vehicle variation and interior content, and exterior design is more readily achievable with multiple and common validated body-skeleton structures. Validation of the vehicle body can be done without the chassis and its hardware. Also, the chassis need not be modified to accept different types of vehicle bodies. Further, simple upgrades to the software, and possibly hardware, are enabled for tuning of the rolling platform.

Figure 26:
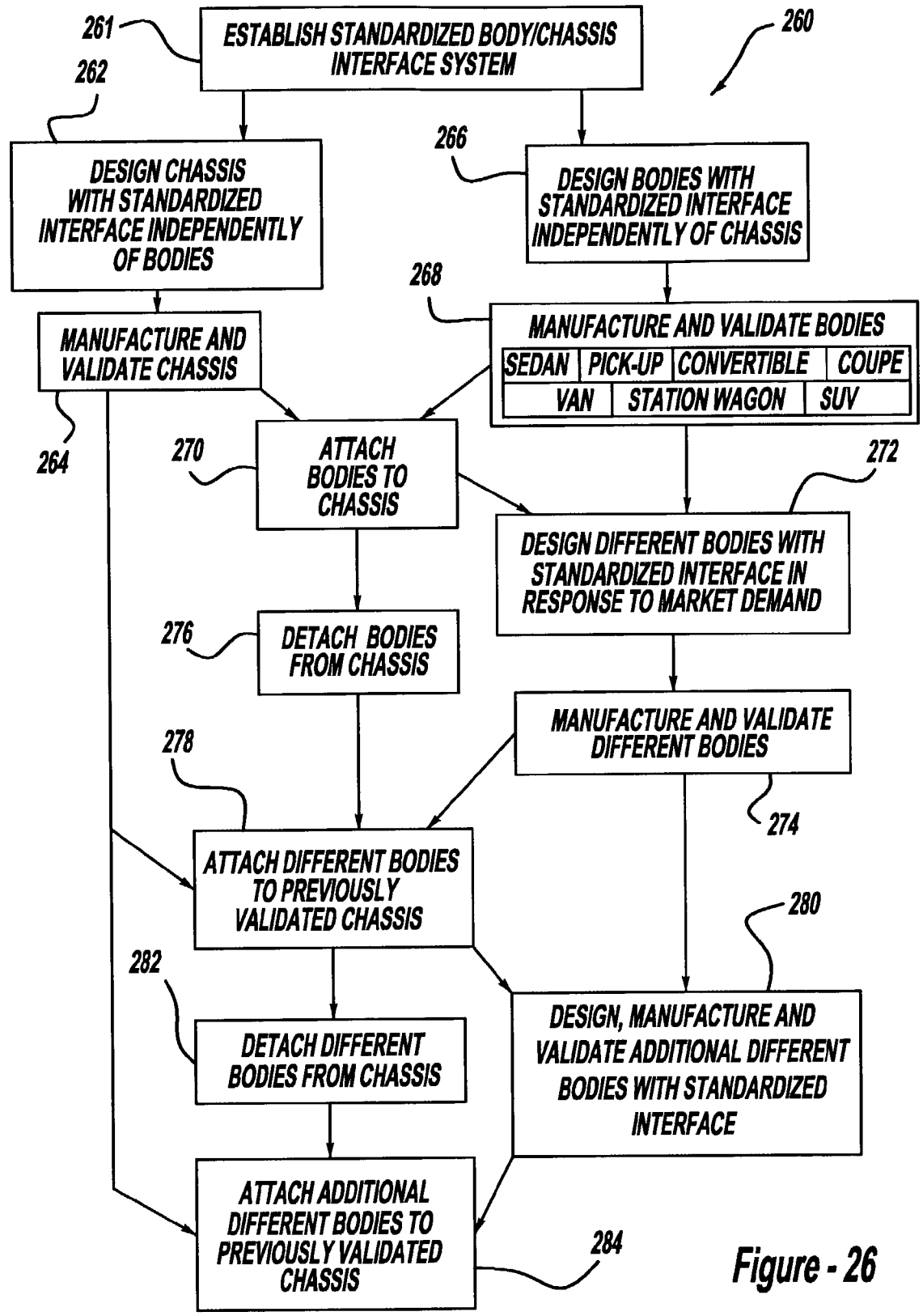
FIG. 26 is a schematic illustration of an accelerated vehicle development process in accordance with the invention.

Referring to FIG. 26, an accelerated vehicle development process 260 is illustrated. The first step (step 261) is to establish a standardized body/chassis interface system whereby different types of bodies may be attached to a single type of chassis through an interface system, such as the interface 87 described previously with reference to FIGS. 1–15, with mechanical and electrical connection components arranged in predetermined spatial relationships relative to each other within an attachment interface on the bodies and chassis.

Once the standardized interface system has been established or predefined, separate design and manufacturing teams, or separate business entities may design and manufacture chassis and bodies independently of each other. The design and manufacture of chassis and bodies may occur concurrently, or the bodies may be designed and manufactured after the chassis are designed and manufactured.

Accordingly, as illustrated in FIG. 26, chassis are designed with the standardized interface independently of bodies (step 262). The designed chassis may then be manufactured and validated (step 264). For example, the chassis may be validated for safety, reliability, quality, emissions, CAFE compliance, squeak and rattle, noise, vibration and harshness, ride and handling, etc.

Concurrently with the design of the chassis, bodies may be designed independently thereof with the standardized interface (step 266). The designed bodies may then be manufactured and validated (step 268). The manufactured and validated bodies may include sedans, pick-up trucks, convertibles, coupes, vans, station wagons, sport-utility vehicles, or other types of transports. Thereafter, the manufactured and validated bodies may be attached to the manufactured and validated chassis (step 270).

Thereafter, different bodies may be designed in compliance with the standardized interface system in response to a perceived market demand (step 272). The different bodies may then be manufactured and validated (step 274). The previously attached bodies may be detached from the chassis (step 276). The different bodies may then be attached to the previously validated chassis (step 278). Thereafter, additional different bodies may be designed, manufactured and validated in compliance with the standardized interface (step 280). The previously attached different bodies may then be detached from the chassis (step 282). Thereafter, the additional different bodies may be attached to the previously validated chassis (step 284).

Accordingly, each time a new body is designed and manufactured in response to a perceived market demand, the vehicle may be developed very quickly because the chassis need not be revalidated and the flat chassis with the standardized interface imposes very few limitations on body re-designs. Accordingly, the body may be quickly designed, manufactured and validated for attachment to the prevalidated chassis. Thus, vehicle development time is accelerated in comparison to the prior art.

Also, as set forth in the claims, different features from different embodiments may be combined within the scope of the present invention.

While the best modes for carrying out the invention have been described in detail, those familiar with the art to which this invention relates will recognize various alternative designs and embodiments for practicing the invention within the scope of the appended claims.

What is claimed is:

1. A method of designing and manufacturing vehicles comprising:

establishing a standard vehicle chassis design including a structural frame; a suspension system mounted to the structural frame; at least three wheels rotatably mounted to the suspension system; an energy conversion system mounted to the structural frame, operably connected to at least one wheel, controllable by wire; a by-wire braking system mounted to the frame and operably connected to at least one wheel; and a computer operatively connected to the energy conversion system and braking system, wherein said standard vehicle chassis design includes a common, standardized interface system having body connection components arranged to facilitate selective attachment of any of a plurality of different body types to the standard chassis;

manufacturing a plurality of chassis in accordance with said standard vehicle chassis design, independently of vehicle bodies; and after said step of manufacturing a plurality of chassis, designing and manufacturing a plurality of different bodies having different body types and configured to conform to said standardized interface system for attachment to said manufactured chassis.

2. The method of claim 1, wherein said different body types are of at least two body categories taken from the group consisting of sedans, pickup trucks, convertibles, coupes, vans, station wagons, sport-utility vehicles, and other types of transports.

3. The method of claim 1, further comprising, after said step of designing and manufacturing a plurality of bodies, attaching the said manufactured bodies to manufactured chassis.

4. The method of claim 3, further comprising, after said attaching step, designing and manufacturing additional bodies having body types different from said attached bodies and configured to conform to said standardized interface system for selective attachment to said manufactured chassis.

5. A method of designing and manufacturing vehicles comprising:

predefining a vehicle body-chassis interface system wherein mechanical and electrical connection components are required to be in predetermined spatial positions relative to each other in a body-attachment interface on a chassis and in corresponding predetermined spatial positions relative to each other in a corresponding chassis-attachment interface on any body to be attached to the chassis;

manufacturing vehicle chassis conforming to said predefined vehicle body-chassis interface system, said vehicle chassis each including a structural frame, a suspension system mounted with respect to the structural frame, at least three wheels rotatably mounted with respect to the suspension system, an energy conversion system mounted with respect to the structural frame, operably connected to at least one wheel, and controllable by wire, and a by-wire braking system mounted with respect to the frame and operably connected to at least one wheel; and after said step of manufacturing chassis, designing and manufacturing vehicle bodies conforming to said standardized interface system for attachment to said manufactured chassis, said bodies including at least three different body styles.

6. A method of designing and manufacturing vehicles comprising:

establishing a standard vehicle chassis design including a structural frame; a suspension system mounted to the structural frame; at least three wheels ratatably mounted to the suspension system; an energy conversion system mounted to the structural frame, operably connected to at least one wheel, controllable by wire; a by-wire braking system mounted to the frame and operably connected to at least one wheel; and a computer operatively connected to the energy conversion system and braking system, wherein said standard vehicle chassis design includes a common, standardized interface system having body connection components arranged to facilitate selective attachment of any of a plurality of different body types to the standard chassis;

manufacturing a plurality of chassis in accordance with said standard vehicle chassis design, independently of vehicle bodies; and after said step of manufacturing a plurality of chassis, designing and manufacturing a plurality of different bodies having different body types and configured to conform to said standardized interface system for attachment to said manufactured chassis, wherein said different body types include at least three types of bodies taken from the group consisting of sedans, pick-up trucks, convertibles, coupes, vans, station wagons and sport-utility vehicles.

* * * * *